United States Patent
Inazumi

(10) Patent No.: US 7,431,462 B2
(45) Date of Patent: Oct. 7, 2008

(54) PROJECTOR, IMAGE DATA CONVERTING METHOD, AND IMAGE DATA CONVERTING PROGRAM

(75) Inventor: Mitsuhiro Inazumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 465 days.

(21) Appl. No.: 11/136,496

(22) Filed: May 25, 2005

(65) Prior Publication Data
US 2005/0264767 A1    Dec. 1, 2005

(30) Foreign Application Priority Data
May 25, 2004   (JP)   .............................. 2004-154649

(51) Int. Cl.
G03B 21/14   (2006.01)
(52) U.S. Cl. .......................................... 353/69; 353/30
(58) Field of Classification Search .................. 353/30, 353/31, 34, 37, 69, 94, 122; 349/5, 7; 345/1.3; 348/745, 747, 806
See application file for complete search history.

(56) References Cited

U.S. PATENT DOCUMENTS

| | | | |
|---|---|---|---|
| 6,369,863 B1 * | 4/2002 | Smith .......................... | 348/744 |
| 6,422,704 B1 * | 7/2002 | Gyoten et al. ............... | 353/122 |
| 6,536,907 B1 * | 3/2003 | Towner et al. .............. | 353/121 |
| 6,793,351 B2 * | 9/2004 | Nelson et al. ............... | 353/122 |
| 6,808,270 B2 * | 10/2004 | Nelson et al. ................. | 353/69 |
| 2003/0142116 A1 | 7/2003 | Mochizuki | |

FOREIGN PATENT DOCUMENTS

| | | |
|---|---|---|
| JP | A 10-133276 | 5/1998 |
| JP | A 10-215461 A | 8/1998 |
| JP | A 11-202408 | 7/1999 |
| JP | A 2003-015581 | 1/2003 |
| JP | A 2003-216130 | 7/2003 |
| JP | A 2003-264847 | 9/2003 |
| JP | A 2004-101719 | 4/2004 |

* cited by examiner

Primary Examiner—William C. Dowling
(74) Attorney, Agent, or Firm—Oliff & Berridge, PLC

(57) ABSTRACT

A projector is provided an image data converting unit that generates output image data by performing predetermined image data conversion on input image data, a multi-panel electro-optical modulating device having plural electro-optical modulating elements each of which generates an image light by modulating a light from an illumination device based on output image data from the image data converting unit, and a projection system that projects plural image lights generated in the multi-panel electro-optical modulating device onto a projection surface as plural projection images. The image data converting unit performs the image data conversion on the input image data for each electro-optical modulating element in the multi-panel electro-optical modulating based on positional displacement information of displacements in position among the plural projection images. It is thus possible to correct displacements in position even when the respective electro-optical modulating elements are misaligned due to rotations about three axes.

15 Claims, 16 Drawing Sheets

PROJECTOR, IMAGE DATA CONVERTING METHOD, AND IMAGE DATA CONVERTING PROGRAM

This application claims the benefit of Japanese Patent Application No. 2004-154649, filed May 25, 2004, the entire disclosure of which is hereby incorporated by reference in its entirety.

BACKGROUND

The exemplary embodiments relate to a projector, an image data converting method, and an image data converting program.

A related art projector of a type that forms image lights of plural colors, either simultaneously or in time division, uses at least one transmissive/reflective, multi-/single-panel electro-optical modulator. The related art projector projects projection images according to these image lights onto a projection screen for combined multi-color images to be displayed on the projection surface.

A related art projector includes two types of electro-optical modulators: a single-panel type and a multi-panel type. The single-panel electro-optical modulator includes a single electro-optical modulating element, and outputs image lights of respective color components forming a multi-color image in time division. On the contrary, the multi-panel electro-optical modulator includes more than one electro-optical modulating element, and outputs image lights of respective color components forming a multi-color image simultaneously.

A projector using either the single- or multi-panel electro-optical modulator is subject to a problem in that image lights of respective color components undergo relative displacements in position unless optical paths of all the colors are exactly the same. Such displacements in position are attributed to relative misalignments at least between two components among the illumination device, plural electro-optical modulating elements, and a projection system provided in the projector. In particular, misalignments of the electro-optical modulator with respect to the projection system often become a major cause.

To address or solve this and/or other problems, a relative positional relation of the electro-optical modulator is corrected with respect to, for example, the projection system for each color component. A correction unit used for this purpose includes a correction unit that makes corrections mechanically, and a correction unit that makes corrections like an electric circuit (for example, see JP-A-11-202408 and JP-A-2003-15581).

JP-A-11-202408 discloses a mechanical correction unit that makes corrections by moving optical components mechanically. The principle of this correction unit is described with reference to FIG. 4 of JP-A-1-202408. The correction unit disclosed in JP-A-11-202408 corrects an image position by moving an optical path in parallel using a plate-shaped transparent member that is interposed diagonally in the optical path. Because a relatively large mechanical displacement can be converted to a small change in the optical path, fine adjustments can be achieved.

JP-A-2003-15581 discloses a correction unit like an electric circuit. The principle of this correction unit is described with reference to FIG. 3, FIG. 4, and FIG. 6 of JP-A-2003-15581. The correction unit disclosed in JP-A-2003-15581 makes corrections by moving only a position at which an effective image display is performed in parallel like an electric circuit while maintaining an immovable position by using an electro-optical modulating element larger than the required number of display pixels in size. This configuration enables corrections to be made regardless of mechanical accuracy and stability.

The correction unit disclosed in JP-A-11-202408, however, requires that a correction mechanism has high mechanical accuracy and stability. To be more specific, because pixels in a currently used electro-optical modulating element are of a size on the order of 10 μm, a mechanism that aligns the positions of these pixels needs to be accurate at a degree that allows precise movements on the order of some micrometers. Moreover, there is another problem in that the correction unit needs to have the capability of maintaining the corrected positions for a long period in actual use environments.

However, the correction unit disclosed in JP-A-2003-15581 solves the problem discussed with respect to JP-A-11-202408. To be more specific, the correction unit disclosed in JP-A-2003-15581 does not need a correction mechanism that has high mechanical accuracy and stability. For this correction unit, it is necessary to fix a relative position of the electro-optical modulating element with respect to the projection system mechanically, so that a relative position of the electro-optical modulating element with respect to the projection system remains stable.

JP-A-11-202408 and JP-A-2003-15581, however, have a common problem. That is, there are only two degrees of freedom of correction (two ways of parallel translations along two axial (x-axis and y-axis directions).

To be more specific, the electro-optical modulating element has six degrees of freedom with respect to the projection system in regard to parallel translations along three axial (x-, y-, and z-axes of 3-D coordinate) directions, and rotations about the three axes (rotations using the three axes as the rotational axes). Six degrees of freedom in regard to parallel translations along the three axial directions and rotations about the three axes are defined as follows. That is, let the z-axis be the optical axis direction of the projection system, the x-axis be a horizontal direction orthogonal to the z-axis, and the y-axis be a vertical direction orthogonal to the z-axis. Thus, the three degrees of freedom in regard to parallel translations are parallel translations in the horizontal direction along the x-axis direction, parallel translations in the vertical direction along the y-axis direction, and parallel translations in the depth direction along the z-axis direction. Also, three degrees of freedom in regard to rotations are rotations about the x-axis using the x-axis as the rotational axis, rotations about the y-axis using the y-axis as the rotational axis, and rotations about the z-axis using the z-axis as the rotational axis.

Hence, both of the correction units disclosed in JP-A-11-202408 and JP-A-2003-15581 only allow that corrections be made in only two degrees of freedom, in regard to parallel translations along the two axial (x-axis and y-axis) directions, instead of six degrees of freedom. Thus, no corrections can be made for the other four degrees of freedom. This problem will now be described in detail with reference to the drawings.

FIGS. 15A and 15B are views used to describe corrections that are likely to occur and be corrected by the correction unit disclosed in JP-A-11-202408 or the correction unit disclosed in JP-A-2003-15581. FIG. 15A is a view showing an input image 10 on an electro-optical modulating element 301, and FIG. 15B is a view showing a projection image 10a on a projection surface.

Referring to FIG. 15B, a square, drawn with a thick line, schematically shows a projection image 10a' used as the reference, and a square, drawn with a thin line, schematically shows the projection image 10a to be corrected. These two squares are of an identical size and parallel translational to each other. In other words, displacements in position in this case are caused only by parallel translations in a direction perpendicular to the optical axis.

Under these conditions, images can be brought into agreement by varying an angle of a plate-shaped transparent member that is interposed diagonally in the optical path, or as is shown in FIG. 15A, by moving a display position of the input image 10 on the electro-optical modulating element 301, in a direction indicated by an arrow 20.

However, in a case where the electro-optical modulating element 301 is misaligned, for example, due to rotations about the three axes (x-axis, y-axis, and z-axis), neither the correction unit disclosed in JP-A-11-202408 nor the correction unit disclosed in JP-A-2003-15581 is able to make corrections.

FIGS. 16A and 16B are schematics showing a projection image when the electro-optical modulating element 301 is misaligned due to rotations about the three axes. FIG. 16A is a schematic showing an input image 10 on the electro-optical modulating element 301, and FIG. 16B is a view showing a projection image 10a on a projection surface. The input image 10 on the electro-optical modulating element 301 is projected onto the projection surface in the form of the projection image 10a, as is shown in FIG. 16B; however, the projection image 10a is deformed into a quadrangle that is not rectangular with respect to the projection image 10a' used as the reference. This deformation resulted from misalignments of the electro-optical modulating element 301 due to rotations about the three axes. When a projection image is deformed as in this case, it is impossible to superimpose the projection image 10a on the projection image 10a', used as the reference, no matter how well the display position of the input image 10 on the electro-optical modulating element 301 is moved in parallel.

FIGS. 17A and 17B are schematics showing a correspondence between input images on electro-optical modulating elements 301, 302, and 303 and their respective projection images formed by a projector having the three electro-optical modulating elements 301, 302, and 303 when each of the electro-optical modulating elements 301, 302, and 303 is misaligned due to rotations about the three axes. FIG. 17A is a schematic showing a manner in which input images 10, 11, and 12, respectively, on the electro-optical modulating elements 301, 302, and 303 are projected onto a projection surface 40. FIG. 17B is a view showing respective projection images 10a, 11a, and 12a on the projection surface 40.

In a case like this, where each of the electro-optical modulating elements 301, 302, and 303 is misaligned due to rotations about the three axes, the projection images 10a, 11a, and 12a corresponding to their respective color components are not formed to be rectangles. Hence, an adequate image cannot be obtained even when corrections are made by the correction unit disclosed in JP-A-11-202408 or the correction unit disclosed in JP-A-2003-15581.

SUMMARY

An advantage of the exemplary embodiments is therefore to provide a projector capable of correcting displacements in position even when each electro-optical modulating element is misaligned, for example, due to rotations about the three axes. The projector is capable of correcting displacements through image data conversion by taking into account positional displacement information about displacements in position among plural projection images generated by one or more than one electro-optical modulating element, and an image data converting method and an image data converting program adapted suitably to such a projector.

A projector according to a first aspect of the exemplary embodiments includes: an image data converting unit that generates output image data by performing predetermined image data conversion on input image data; a multi-panel electro-optical modulating device having plural electro-optical modulating elements each of which generates an image light by modulating a light from an illumination device according to output image data from the image data converting unit; and a projection system that projects plural image lights generated in the multi-panel electro-optical modulating device onto a projection surface as plural projection images. The image data converting unit performs the image data conversion on the input image data for each electro-optical modulating element in the multi-panel electro-optical modulating device based on positional displacement information of displacements in position among the plural projection images.

Hence, the projector according to the first aspect of the exemplary embodiments, using the multi-panel electro-optical modulating device, is able to make corrections for all the six degrees of freedom as the image data converting unit performs image data conversion by taking into account positional displacement information about displacements in position among plural projection images when it performs image data conversion (for example, image corrections (corrections in shape, luminance, and color, and corrections of keystone distortion), resolution conversion, addition of special effects, etc.). It is thus possible to correct displacements in position even when the respective electro-optical modulating elements are misaligned, for example, due to rotations about three axes.

In the projector according to the first aspect of the exemplary embodiments, the image data converting unit has an image correction unit that corrects the input image data for each electro-optical modulating element by taking the positional displacement information into account.

When configured in this manner, the image data converting unit is able to correct input image data for each electro-optical modulating element when performing image data conversion.

In the projector according to the first aspect of the exemplary embodiments, the position of displacements, among the plural projection images, resulted from relative misalignments at least between two components among the illumination device. The two components include the plural electro-optical modulating elements, and the projection system.

Displacements in position occurring in a projector often result from relative misalignments at least between the two components among the illumination device. The projector according to the first aspect configured as described above is able to correct displacements in position resulted from such relative misalignments, at least between the two components among the illumination device.

In the projector according to the first aspect of the exemplary embodiments, position of the displacements among the plural projection images resulted from misalignments of the plural electro-optical modulating elements with respect to the projection system due to at least one of parallel translations and rotations.

Displacements in position occurring in a projector often result from parallel translations or rotations or both of plural electro-optical modulating elements with respect to the projection system. The projector according to the first aspect configured as described above is able to correct displacements in position resulted from such parallel translations or rotations or both of the plural electro-optical modulating elements with respect to the projection system.

In the projector according to the first aspect of the exemplary embodiments, the image correction unit includes: an input pixel value obtaining unit that obtains an input pixel value from the input image data; a correction parameter memory unit that stores correction parameters generated on the basis of the positional displacement information; an output pixel position generating unit that generates one or more than one output pixel position in the neighborhood of an input pixel position for respective input pixel positions obtained from the input image data on the basis of the correction parameters; an output pixel value generating unit that generates, as an output pixel value, a pixel value at the one or more than one output pixel position by distributing the input pixel value at each input pixel position to a pixel at the one or more than one output pixel position; and an output image data memory unit that stores the output pixel position and the output pixel value.

This is the configuration of the image correction unit corresponding to the first exemplary embodiment described below. Image corrections of the exemplary embodiments can be achieved by configuring the image correction unit, as described above.

In the projector according to the first aspect of the exemplary embodiments, the image data converting unit further includes an input image data memory unit that stores the input image data, and that image correction unit includes: an input pixel value obtaining unit that obtains an input pixel value from the input image data stored in the input image data memory unit; a correction parameter memory unit that stores correction parameters generated on the basis of the positional displacement information; an input pixel position generating unit that finds a temporary input pixel position corresponding to a given output pixel on the basis of the correction parameters, and then generates one or more than one input pixel position in the neighborhood of the temporary input pixel position found previously; and an output pixel value generating unit that interpolates a pixel value of the one output pixel on the basis of the input pixel value at the one or more than one input pixel position, and then generates an interpolated pixel value as an output pixel value.

This is the configuration of the image correction unit corresponding to a second exemplary embodiment described below. Image corrections of the exemplary embodiment can also be achieved by configuring the image correction unit, as described above.

In the projector according to the first aspect of the exemplary embodiment the image correction unit further includes a range judging unit that judges whether the one or more than one input pixel position falls within a range of the input image data.

This configuration makes it possible to judge whether one or more than one input pixel position generated previously falls within the range of the input image data, and a pixel value can be thereby interpolated appropriately according to the output pixel position.

In the projector according to the first aspect of the exemplary embodiments, the image correction unit further includes a correction parameter re-adjusting unit capable of re-adjusting the correction parameters.

This is the configuration of the image correction unit that corresponds to a third exemplary embodiment described below. By configuring the image correction unit in this manner, it is possible to re-adjust correction parameters to optimum values even when relative misalignments of the plural electro-optical elements with respect to the projection system vary with time or for any other reason.

In the projector according to the first aspect of the exemplary embodiments, the correction parameter re-adjusting unit has a capability of changing an vertex position of the input image data formed on each of the electro-optical modulating elements.

When the correction parameter re-adjusting unit has the capability of changing the vertex position of the input image data in this manner, the correction parameters can be readily re-adjusted.

In the projector according to the first aspect of the exemplary embodiments, the image data converting unit further includes an input image data separating unit that separates the input image data for each of the electro-optical modulating elements.

By providing the input image data separating unit in this manner, it is possible to perform various kinds of image data conversion (for example, image corrections (corrections in shape, luminance, and color, and corrections of keystone distortion), resolution conversion, addition of special effects, etc.) independently on the image data separated by the input image data separating unit.

The input image data separating unit can be, for example, a unit that separates the input image data into color components, a unit that separates the input image data into a luminance signal and a chromaticity signal, etc.

In the projector according to the first aspect of the exemplary embodiments, the multi-panel electro-optical modulating device includes plural electro-optical modulating elements that modulate lights of respective color components obtained as a result of color separation.

This configuration enables various kinds of image data conversion (for example, image corrections (corrections in shape, luminance, and color, and corrections of keystone distortion), resolution conversion, addition of special effects, etc.) to be performed for each color component (for example, red, green, and blue) in the input image data.

In the projector according to the first aspect of the exemplary embodiments, the multi-panel electro-optical modulating device includes an electro-optical modulating element that modulates a light based on a luminance signal and an electro-optical modulating element that modulates a light based on a chromaticity signal.

This configuration enables various kinds of image data conversion (for example, image corrections (corrections in shape, luminance, and color, and corrections of keystone distortion), resolution conversion, addition of special effects, etc.) to be performed independently for the electro-optical modulating element that modulates a light based on a luminance signal and an electro-optical modulating element that modulates a light according to a chromaticity signal.

An image data converting method according to a second aspect of the exemplary embodiments, is an image data converting method adapted to a projector that includes: an image data converting unit that generates output image data by performing predetermined image data conversion on input image data; a multi-panel electro-optical modulating device having plural electro-optical modulating elements each of which generates an image light by modulating a light from an illumination device based on output image data from the image data converting unit; and a projection system that projects plural image lights generated in the multi-panel electro-optical modulating device onto a projection surface as plural projection images. The method includes performing image data conversion on the input image data for each of the electro-optical modulating elements in the multi-panel electro-modulating device based on positional displacement information of displacements in position among the plural projection images.

With the image data converting method according to the second aspect of the exemplary embodiment adapted to a projector using a multi-panel electro-optical modulating device, it is possible to make corrections for all the six degrees of freedom through image data conversion (for example, image corrections (corrections in shape, luminance, and color, and corrections of keystone distortion), resolution conversion, addition of special effects, etc.) by performing the image data conversion by taking into account positional displacement information about displacements in position among plural projection images. It is thus possible to correct displacements in position even when the respective electro-optical modulating elements are misaligned, for example, due to rotations about the three axes.

In the image data converting method according to the second aspect of the exemplary embodiments, a projector using this method has characteristics that were described as characteristics of the projector according to the first aspect of the exemplary embodiments.

An image data converting program, encoded on a computer readable medium, according to a third aspect of the exemplary embodiments is a program adapted to a projector that includes an image data converting unit that generates output image data by performing predetermined image data conversion on input image data, a multi-panel electro-optical modulating device having plural electro-optical modulating elements each of which generates an image light by modulating a light from an illumination device based on output image data from the image data converting unit, and a projection system that projects plural image lights generated in the multi-panel electro-optical modulating device onto a projection surface as plural projection images. The program has instructions that causes the image data converting unit to perform image data conversion on the input image data for each of the electro-optical modulating elements in the multi-panel electro-modulating device by taking into account positional displacement information about displacements in position among the plural projection images.

With the image data converting program according to the third aspect of the exemplary embodiments adapted to a projector using a multi-panel electro-optical modulating device, it is possible to make corrections for all the six degrees of freedom, because when image data conversion (for example, image corrections (corrections in shape, luminance, and color, and corrections of keystone distortion), resolution conversion, addition of special effects, etc.) is performed, the image data conversion can be performed by taking into account positional displacement information of displacements in position among plural projection images. It is thus possible to correct displacements in position even when the respective electro-optical modulating elements are misaligned, for example, due to rotations about the three axes.

In the image data converting program according to the third aspect of the exemplary embodiments, a projector using this program has characteristics that were described as characteristics of the projector according to the first aspect of the exemplary embodiments.

A projector according to a fourth aspect of the exemplary embodiments include an image data converting unit that generates output image data by performing predetermined image data conversion on input image data, a single-panel electro-optical modulating device having a single electro-optical modulating element that generates plural image lights by modulating a light from an illumination device in time division based on output image data from the image data converting unit, and a projection system that projects plural image lights generated in the single-panel electro-optical modulating device onto a projection surface as plural projection images. The image data converting unit performs the image data conversion on the input image data independently for the input image data forming each of the plural projection images by taking into account positional displacement information about displacements in position among the plural projection images.

Hence, the projector according to the fourth aspect of the exemplary embodiments using the single-panel electro-optical modulating device is able to make corrections for all the six degrees of freedom as the image data converting unit performs image data conversion based on positional displacement information of displacements in position among plural projection images when it performs image data conversion (for example, image corrections (corrections in shape, luminance, and color, and corrections of keystone distortion), resolution conversion, addition of special effects, etc.). It is thus possible to correct displacements in position among plural projection images caused when, for example, optical axes of respective colors are displaced with each other.

It is also preferable for the projector according to the fourth aspect of the exemplary embodiments that the projector has applicable characteristics among those described as preferable characteristics of the projector according to the first aspect of the exemplary embodiments.

An image data converting method according to a fifth aspect of the exemplary embodiments is a method adapted to a projector that includes an image data converting unit that generates output image data by performing predetermined image data conversion on input image data, a single-panel electro-optical modulating device having a single electro-optical modulating element that generates plural image lights by modulating a light from an illumination device in time division based on output image data from the image data converting unit, and a projection system that projects plural image lights generated in the single-panel electro-optical modulating device onto a projection surface as plural projection images. The method includes performing the image data conversion on the input image data independently for the input image data forming each of the plural projection images by taking into account positional displacement information about displacements in position among the plural projection images.

With the image data converting method according to the fifth aspect of the exemplary embodiments adapted to a projector using a single-panel electro-optical modulating device, it is possible to make corrections for all the six degrees of freedom through image data conversion (for example, image corrections (corrections in shape, luminance, and color, and corrections of keystone distortion), resolution conversion, addition of special effects, etc.) by performing the image data conversion based on positional displacement information of displacements in position among plural projection images. It is thus possible to correct displacements in position among plural projection images caused when, for example, optical axes of respective colors are displaced with each other.

In the data converting method according to the fifth aspect of the exemplary embodiments, a projector using this method has applicable characteristics among those described as characteristics of the projector according to the first aspect of the exemplary embodiments.

An image data converting program according to a sixth aspect of the exemplary embodiments is a program encoded on a computer readable medium, adapted to a projector that includes an image data converting unit that generates output image data by performing predetermined image data conversion on input image data, a single-panel electro-optical modulating device having a single electro-optical modulating element that generates plural image lights by modulating a light from an illumination device in time division based on output image data from the image data converting unit, and a projection system that projects plural image lights generated in the single-panel electro-optical modulating device onto a projection surface as plural projection images. The program has instructions to cause the image data converting unit to perform the image data conversion on the input image data independently for the input image data forming each of the plural projection images based on positional displacement information of displacements in position among the plural projection images.

With the image data converting program according to the sixth aspect of the exemplary embodiments adapted to a projector using a single-panel electro-optical modulating device, it is possible to make corrections for all the six degrees of freedom, because when image data conversion (for example, image corrections (corrections in shape, luminance, and color, and corrections of keystone distortion), resolution conversion, addition of special effects, etc.) is performed, the image data conversion can be performed by taking into account positional displacement information about displacements in position among plural projection images. It is thus possible to correct displacements in position among plural projection images caused when, for example, optical axes of respective colors are displaced with each other.

In the data converting program according to the sixth aspect of the exemplary embodiments a projector using this program has applicable characteristics among those described as characteristics of the projector according to the first aspect of the exemplary embodiments.

BRIEF DESCRIPTION OF THE DRAWINGS

The invention will be described with reference to the accompanying drawings, wherein like numbers reference like elements, and wherein.

DETAILED DESCRIPTION OF THE EMBODIMENTS

Figure 1:
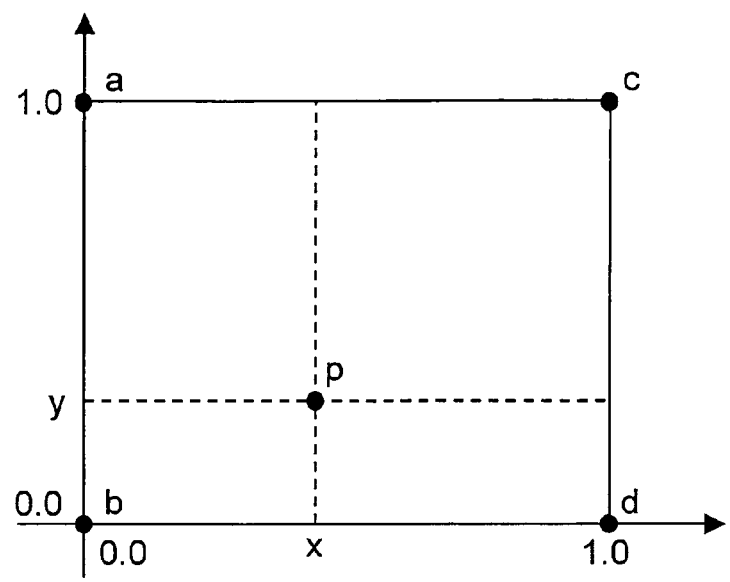
FIG. 1 is a schematic used to describe a manner in which input image data is represented by a normalized coordinate in an exemplary embodiment.

Hereinafter, a projector, an image data converting method, and an image data converting program of the exemplary embodiments will be described by way of embodiments shown in the drawings. Each exemplary embodiment below describes a case where displacements in position among plural projection images, resulted from misalignments of the electro-optical modulating element with respect to the projection system due to parallel translations or rotations or both, are corrected through image data conversion.

Before each exemplary embodiment, contents of processing needed in each exemplary embodiment will be described in detail. In each of the exemplary embodiments, it has to be taken into account that pixels in image data that has been inputted (hereinafter, referred to as input image data) are not in a one-to-one correspondence with pixels on the electro-optical modulating element.

For comparison, in the case of the correction unit disclosed in JP-A-11-202408 or the correction unit disclosed in JP-A-2003-15581, pixels in input image data and pixels on the electro-optical modulating element are in a one-to-one correspondence because each correction unit merely makes corrections on displacements in position resulted from parallel translations. However, when all of the six degrees of freedom of the electro-optical modulating element are concerned, a one-to-one correspondence is not established because plural projection images outputted from the one or more than one electro-optical modulating element are deformed by being rotated or scaled up or down.

For ease of description, the input image data is represented by normalized coordinates in each exemplary embodiment below.

FIG. 1 is a schematic used to describe a manner in which the input image data is represented by normalized coordinates. Referring to FIG. 1, assume that W pixels are present in the horizontal direction (width direction) of the input image data, then an x'th pixel in the horizontal direction is represented by a normalized coordinate, x/(W-1). The normalized coordinate itself takes a floating-point value; however, because the input image data takes discrete values up to the W pixels, a normalized coordinate in the horizontal direction also takes a discrete value in the unit of 1/(W-1). Likewise, assume that there are H pixels in the vertical direction (height direction) of the input image data, then a y'th pixel in the vertical direction is represented by a normalized coordinate, y/(H-1).

According to this assumption, (0.0, 1.0) is given as the normalized coordinate of an upper leftmost pixel a in the input image data, and (0.0, 0.0) is given as the normalized coordinate of a lower leftmost pixel b. Likewise, (1.0, 1.0) and (1.0, 0.0) are given as those of an upper rightmost pixel c and a lower rightmost pixel d, respectively.

Figure 2:
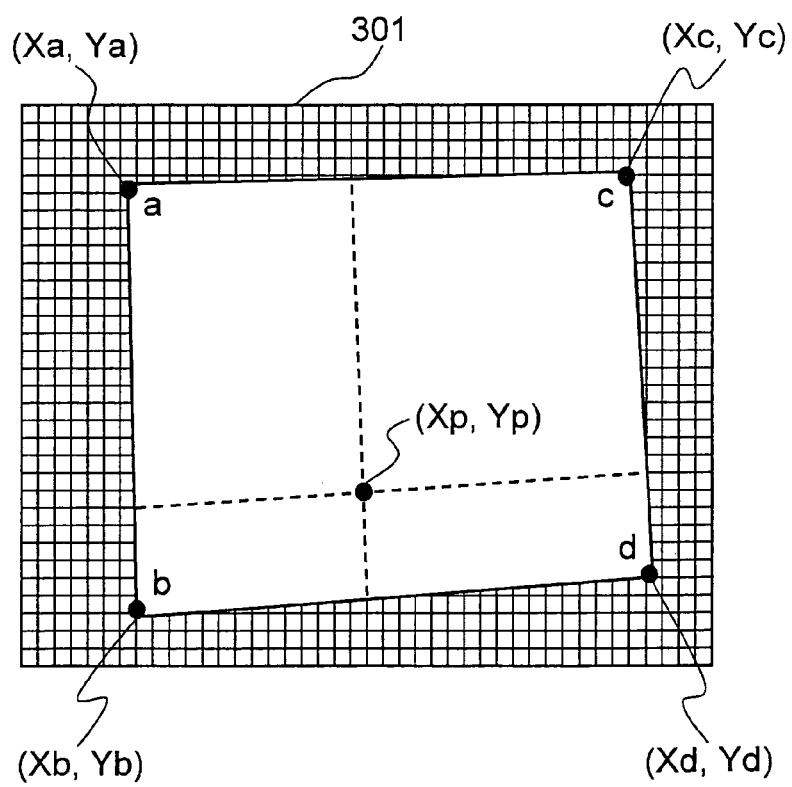
FIG. 2 is a schematic showing a case where a given piece of input image data is corrected, and then the corrected input image data is inputted into an electro-optical modulating element in an exemplary embodiment.

FIG. 2 is a schematic showing a case where input image data is corrected, and the corrected input image data is inputted into one electro-optical modulating element 301. Because the electro-optical modulating element 301 has discrete pixels, the position of a pixel on the electro-optical modulating element 301 is represented also by a coordinate (X, Y).

In this instance, as is shown in FIG. 2, the pixel a in FIG. 1 is mapped on a coordinate (Xa, Ya). Likewise, the pixel b is mapped on a coordinate (Xb, Yb), the pixel c is mapped on a coordinate (Xc, Yc), and the pixel d is mapped on a coordinate (Xd, Yd).

Importantly, once the coordinates (Xa, Ya), (Xb, Yb), (Xc, Yc), and (Xd, and Yd) of four points (four corners) are given, the inside coordinates are determined uniquely. To be more specific, a point p given by the normalized coordinate (x, y) in the input image data shown in FIG. 1 is mapped on a coordinate (Xp, Yp), and their values are determined in accordance with the following equations:

$$Xp = (1 - x - y + xy)Xb + y(1 - x)Xa + x(1 - y)Xd + xyXc \quad (1)$$

$$Yp = (1 - x - y + xy)Yb + y(1 - x)Ya + x(1 - y)Yd + xyYc \quad (2)$$

Hence, all the linear corrections are possible when coordinates of four corners of an input image formed on the electro-optical modulating element are given as correction parameters.

However, as has been described, because x and y take floating-point values, values of Xp and Yp obtained using Equation (1) and Equation (2) above are not integers in general. On the other hand, because the electro-optical modulating element is able to display discrete pixels alone, display pixels are present only at the integer positions. In short, floating-point position data needs to be processed in some way.

Figure 3A:
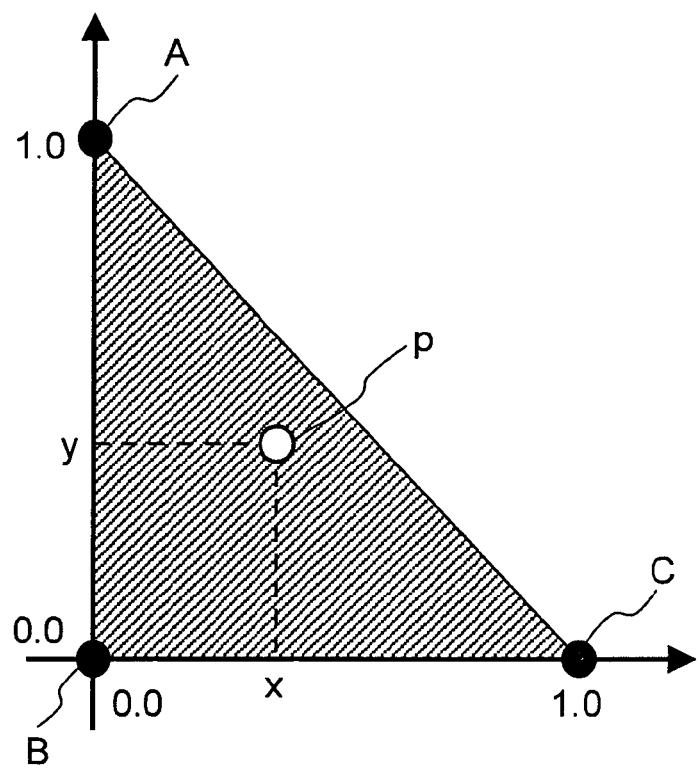
FIGS. 3A and 3B are schematics used to describe processing through which floating-point position data is converted to a discrete integer pixel position in an exemplary embodiment.
Figure 3B:
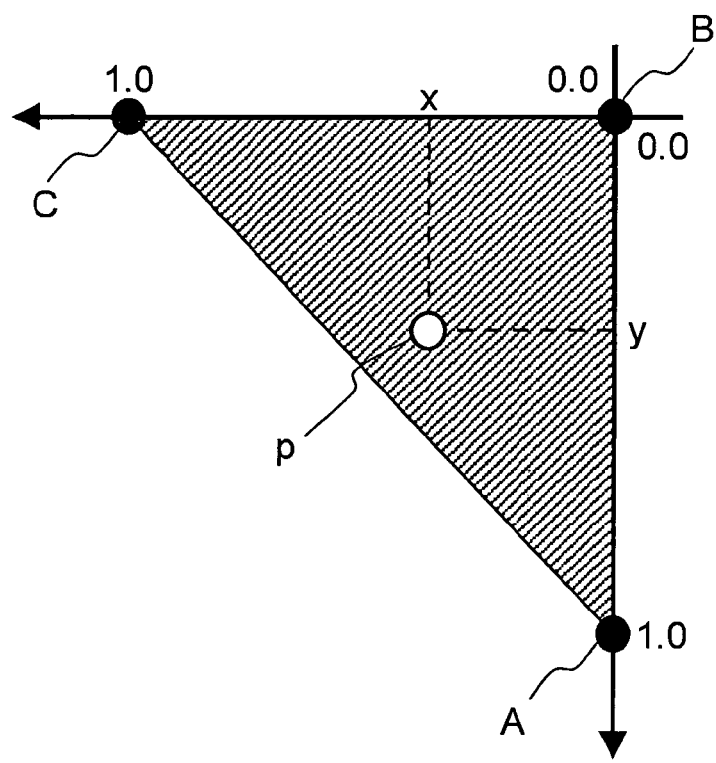

FIGS. 3A and 3B are schematics used to describe processing through which floating-point position data is converted to a discrete integer pixel position. To begin with, let pixel positions A, B, and C be three integer coordinate pixel positions in the neighborhood of the point p given by the coordinate (Xp, Yp). Herein, a triangular configuration having the right angle at the lower left, as is shown in FIG. 3A, and a triangular configuration having the right angle at the upper right, as is shown in FIG. 3B are shown by way of example. It goes without saying that descriptions are substantially the same when triangles having the right angle at the lower right or upper left is shown by way of example. Also, because descriptions in the case of FIG. 3A and in the case of FIG. 3B are substantially the same, descriptions will be given with reference to FIG. 3A alone herein.

As is shown in FIG. 3A, normalized coordinates are considered herein. In other words, only the fractional parts of (Xp, Yp) are extracted, and (x, y) is given as the normalized coordinate.

A pixel value of one pixel in the input image data is distributed to one or more than one (three, herein) output pixel in the neighborhood using the normalized coordinate. Also, a pixel value of one output pixel is interpolated with the use of one or more than one (three, herein) pixel in the input image data using the normalized coordinate.

For example, referring to FIG. 3A, when a pixel value of one pixel (a pixel at the point p) in the input image data is to be distributed to three output pixels in the neighborhood (pixels at the pixel positions A, B, and C), a pixel value (let V be this value) of the pixel at the point p can be distributed to pixels at the three pixel positions A, B, and C in the neighborhood using the normalized coordinate (x, y) in accordance with the following equations:

$$A = yV \quad (3)$$

$$B = (1 - x - y)V \quad (4)$$

$$C = xV \quad (5)$$

Equations (3) through (5) above mean, respectively, that yV is added to a pixel value pre-assigned to the pixel position A, (1-x-y)V is added to a pixel value pre-assigned to pixel position B, and xV is added to a pixel value pre-assigned to the pixel position C. In short, these equations are to distribute values linearly to the three points at the pixel positions A, B, and C with a dependence on distances from these points.

With respect to Equations (3) through (5) above, assume that either Xp or Yp or both take integers, then the same result is obtained by choosing any of three arbitrary pixel positions in the neighborhood.

Operations to interpolate a pixel value of one output pixel using one or more than one pixel in the input image data will be described below in a second exemplary embodiment.

Hereinafter, respective exemplary embodiments of the invention will be described.

First Exemplary Embodiment

Figure 4:
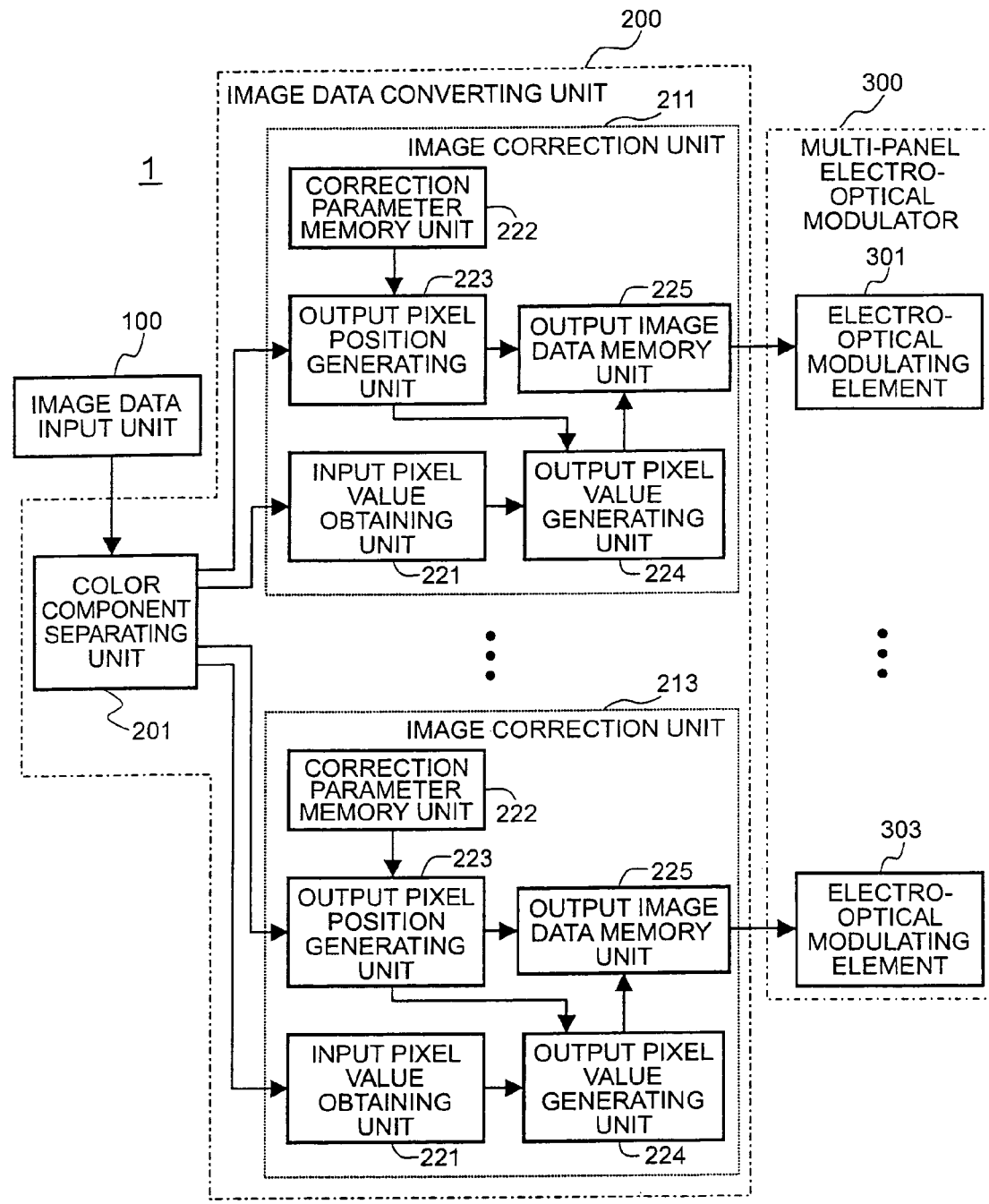
FIG. 4 is a schematic showing the configuration of a projector according to a first exemplary embodiment.

FIG. 4 is a schematic showing the schematic configuration of a projector according to a first exemplary embodiment. A projector 1 according to the first exemplary embodiment is a projector provided with a multi-panel electro-optical modulator including plural electro-optical modulating elements.

Broadly speaking, the projector 1 according to the first exemplary embodiment comprises: an image data input unit 100; an image data converting unit 200 that generates output image data by performing predetermined image data conversion on input image data from the image data input unit 100; a multi-panel electro-optical modulator 300 that generates plural image lights by modulating lights from an illumination device (not shown) according to output image data outputted from the image data converting unit 200; and a projection system (not shown) that projects plural image lights generated in the multi-panel electro-optical modulator 300 onto a projection surface in the form of plural projection images.

The image data converting unit 200 includes a color component separating unit 201 serving as an input image data separating device, and a plurality (three, for example) image correction units 211 through 213 provided correspondingly to respective color components (red, green, and blue, herein) separated in the color component separating unit 201. In this case, because color components are three colors including red, green, and blue, the electro-optical modulator 300 includes three electro-optical modulating elements 301 through 303 that respectively correspond to these three colors.

Each of the image correction units 211 through 213 includes: an input pixel value obtaining unit 221 that obtains pixel values of input pixel data (hereinafter, referred to as the input pixel values) for respective color components separated in the color component separating unit 201; a correction parameter memory unit 222 that stores correction parameters generated on the basis of positional displacement information about displacements in position among respective projection images generated by the respective electro-optical modulating elements 301 through 303; an output pixel position generating unit 223 that generates one or more than one (for example, three output pixel positions in the neighborhood of an input pixel position for respective input pixel positions obtained from the input image data; an output pixel value generating unit 224 that generates pixel values at three output pixel positions as output pixel values by distributing an input pixel value at the input pixel position to pixels at the three output pixel positions generated as described above; and an output image data memory unit 225 that stores the output pixel positions and the output pixel values both generated as described above.

Correction parameters can be generated on the basis of positional displacement information about displacements in position among respective projection images generated by the respective electro-optical modulating elements 301 through 303. In the first embodiment, correction parameters thus generated are stored into the correction parameter memory unit 222 in advance at the time of manufacturing or shipment of the projector 1.

Image correction operations by the image correction units 211 through 213 will now be described. In the first exemplary embodiment, input image data from the image data input unit 100 is separated into respective color components in the color component separating unit 201. The image correction units 211 through 213 correct images for respective color components obtained as a result of color component separation. Corrected image data is then converted to image lights in the corresponding electro-optical modulating elements 301 through 303, and these image lights are projected for a multi-color image to be displayed on the projection surface.

Figure 5:
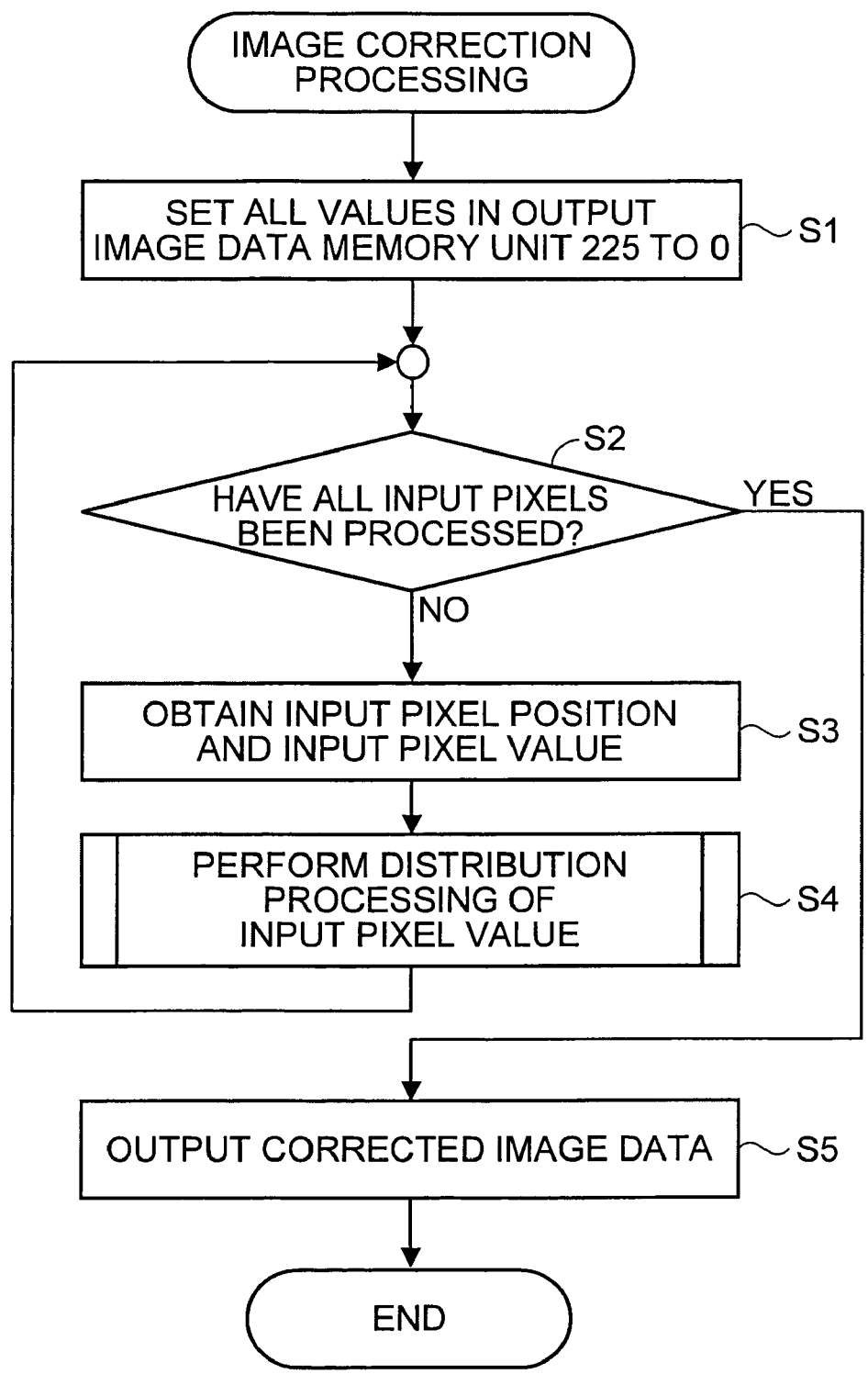
FIG. 5 is a flowchart detailing image correction processing that each image correction unit in the projector performs on a screenful of input image data according to the first exemplary embodiment.

FIG. 5 is a flowchart detailing image correction processing that each of the image correction units 211 through 213, in the projector 1, according to the first exemplary embodiment, performs on a screenful of input image data.

As is shown in FIG. 5, initially, all the stored values in the output image data memory unit 225 are reset to 0 (Step S1). Thereafter, distribution processing is repeated (Steps S2 through S4), by which a pixel value of one pixel given from the color component separating unit 201 is distributed to plural output pixels in the neighborhood.

To be more specific, whether all the input pixels forming one screen have undergone image correction processing is judged (Step S2). When not all the input pixels forming one screen have undergone the image correction processing, an input pixel position for a given color component and an input pixel value at the input pixel position are obtained (Step S3). Distribution processing of an input pixel value is then performed (Step S4), by which the input pixel value at the input pixel position is distributed to respective pixels (hereinafter, referred to as output pixels) at the three output pixel positions in the neighborhood. The distribution processing of an input pixel value is the process through which a pixel value of an output pixel (hereinafter, referred to as the output pixel value) is generated by distributing an input pixel value to the respective output pixels at the output pixel positions generated by the output pixel position generating unit 223.

When the image correction processing is completed for all the input pixels forming one screen, the input image data is outputted as corrected image data having undergone the distribution processing (Step S5).

Figure 6:
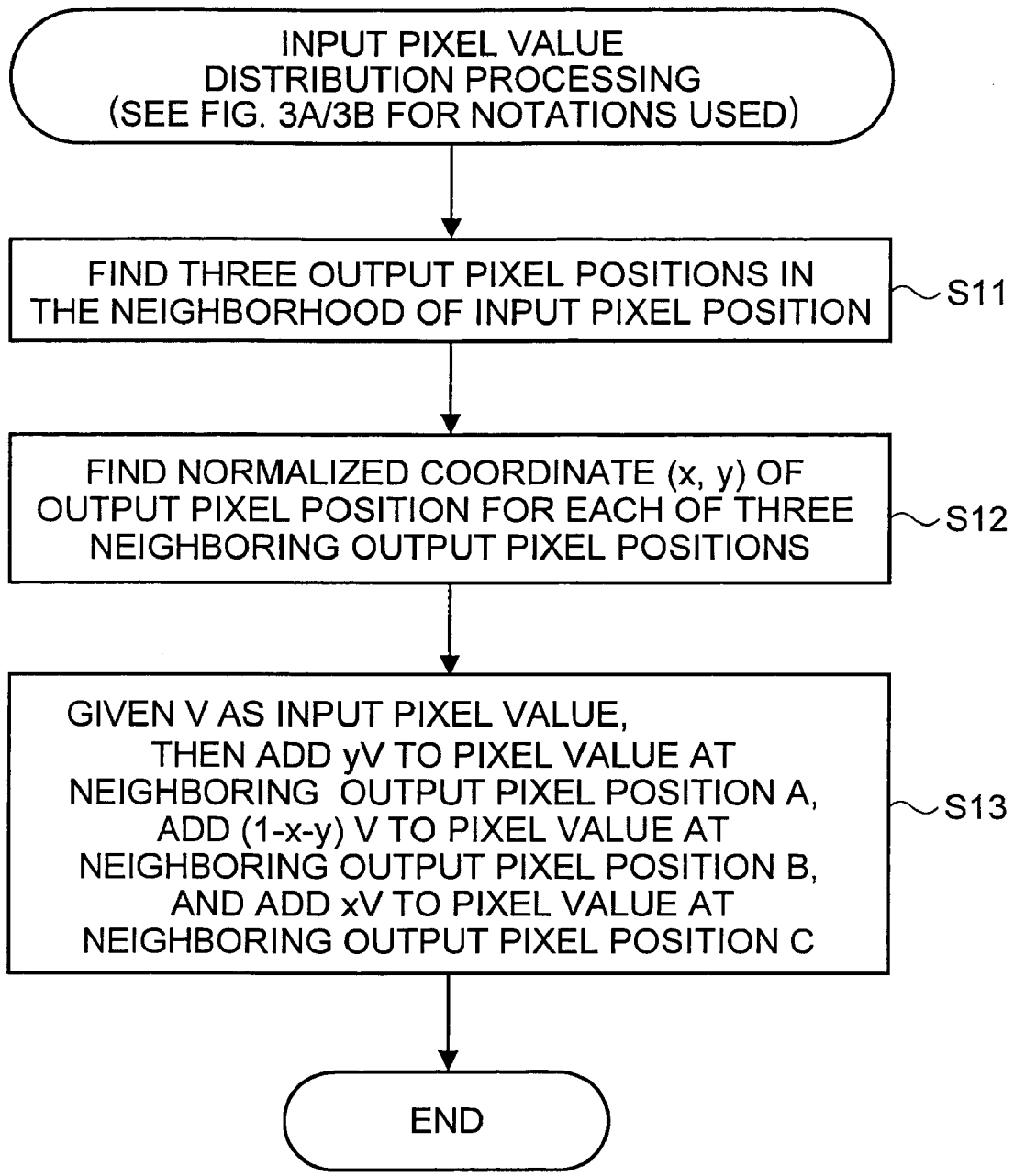
FIG. 6 is a flowchart detailing distribution processing of an input pixel value shown in Step S4 of FIG. 5.

FIG. 6 is a flowchart detailing the distribution processing of the input pixel value shown in Step S4 of FIG. 5. The distribution processing of the input pixel value has been described with reference to FIG. 3; however, the distribution processing of the input pixel value will be described briefly again with reference to FIG. 6.

Initially, three output pixel positions A, B, and C in the neighborhood of the input pixel position p (hereinafter, referred to as the neighboring output pixel positions A, B, and C) are found (Step S11). Subsequently, a normalized coordinate (x, y) of an output pixel position is found for each of the three neighboring output image pixel positions A, B, and C (Step S12).

Given V as an input pixel value, then yV is added to the pixel value at the neighboring output pixel position A, (1-x-y)V is added to the pixel value at the neighboring output pixel position B, and xV is added to the pixel value at the neighboring output pixel position C (Step S13). Subsequently, the output pixel values at the three neighboring output pixel positions A, B, and C obtained in Step S13 and their output pixel positions are stored in the output image data memory unit 225.

As has been described, it is possible in the first exemplary embodiment to correct all the displacements in position with regards to six degrees of freedom of the electro-optical modulating elements 301 through 303 corresponding to respective color components by merely giving, as correction parameters, coordinates of four corners of the input images on the respective electro-optical modulating elements 301 through 303 for respective color components obtained as a result of color separation. In addition, because input image data is processed successively, there is no need to save the input image data.

Figure 7A:
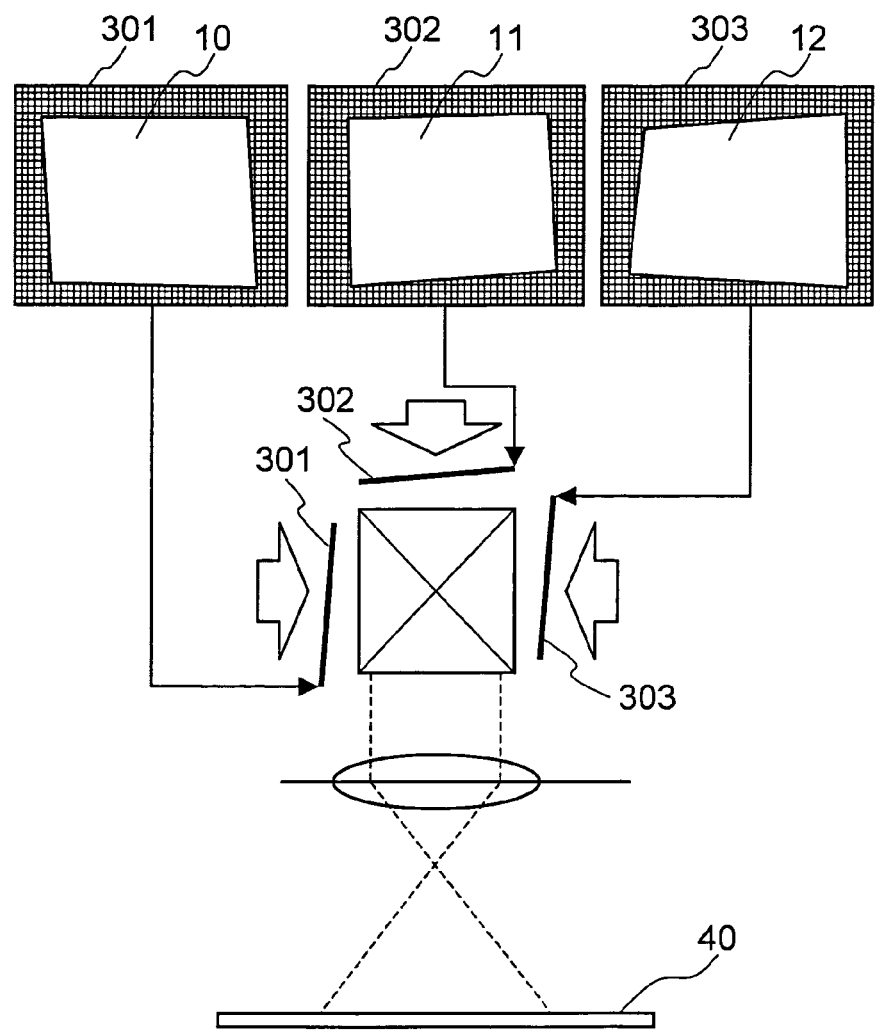
FIGS. 7A and 7B are schematics showing a correspondence between input images on the respective electro-optical modulating elements and respective projection images when the correction processing is performed according to the first embodiment.
Figure 7B:
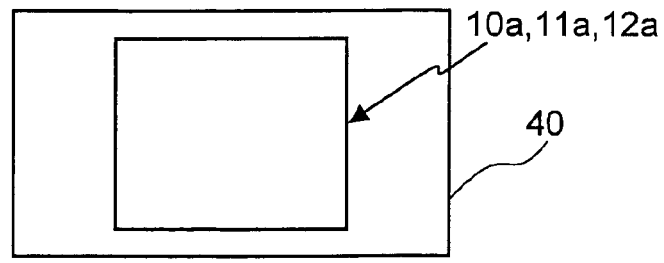

FIGS. 7A and 7B are schematics showing a correspondence between input images on the respective electro-optical modulating elements 301 through 303 and respective projection images when correction processing according to the first embodiment is performed. FIG. 7A is a view showing a manner in which input images 10, 11, and 12, respectively, on the electro-optical modulating elements 301, 302, and 303 are projected onto the projection surface 40. FIG. 7B is a view showing respective projection images 10a, 11a, and 12a on the projection surface 40.

Figure 17A:
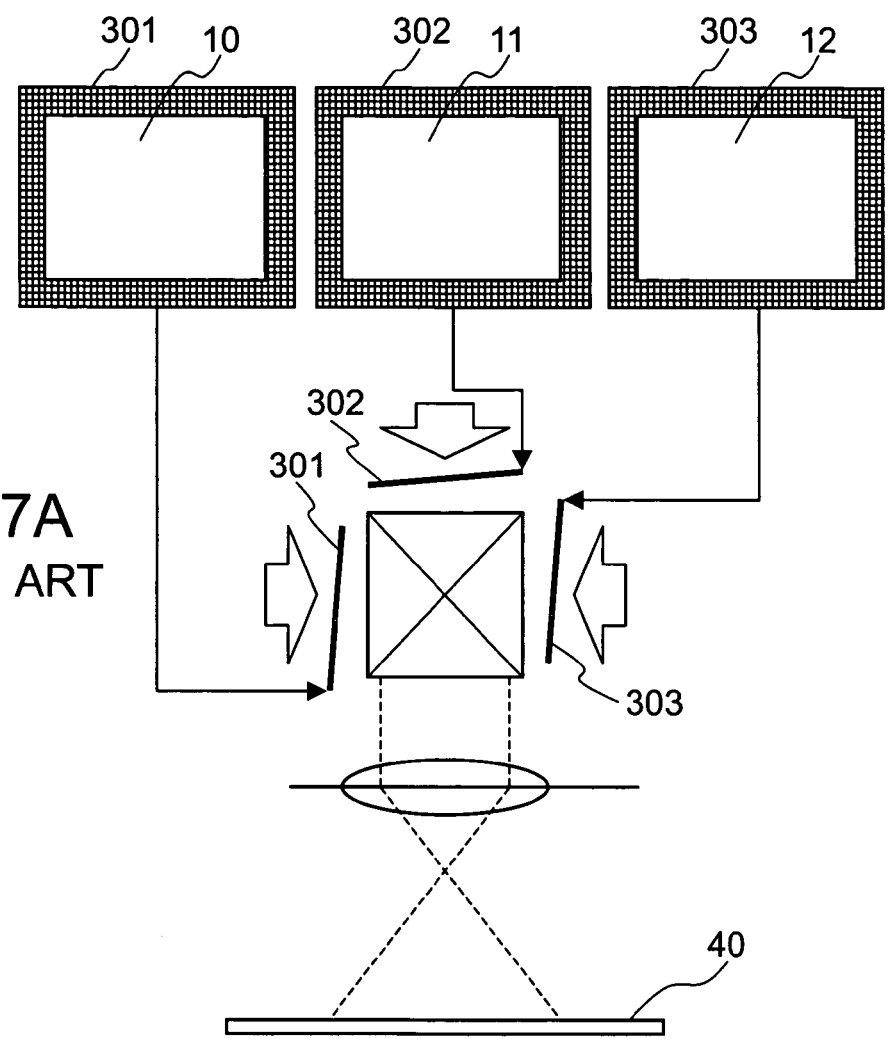
FIGS. 17A and 17B are views showing a correspondence between input images on the respective electro-optical modulating elements and respective projection images when the respective electro-optical modulating elements are misaligned due to rotations about three axes in the related art.
Figure 17B:
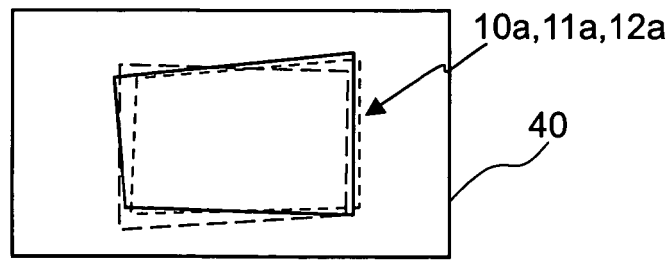

As can be understood from FIGS. 7A and 7B, according to the first exemplary embodiment, even when the respective electro-optical modulating elements 301 through 303 are misaligned due to parallel translations or rotations or both, it is possible to reduce or eliminate influences of misalignments of the respective electro-optical modulating elements 301 through 303 due to rotations from the projection images 10a, 11a, and 12a on the projection screen 40 that correspond, respectively, to the electro-optical modulating elements 301 through 303. It is possible to reduce or eliminate the influences of misalignments of the respective electro-optical modulation elements 301 through 303 by performing image corrections on the input images 10, 11, and 12 by taking into account misalignments of each of the electro-optical modulating elements 301 through 303. In comparison, where each of the three electro-optical modulating elements 301 through 303 is misaligned due to rotations in the related art, as has been described with reference to FIG. 17, projection images 10a, 11a, and 12a, respectively, from the electro-optical modulating elements 301 through 303 are displayed on the projection surface 40 under the influences of misalignment of the respective electro-optical modulating elements 301 through 303 due to rotations.

Second Exemplary Embodiment

Figure 8:
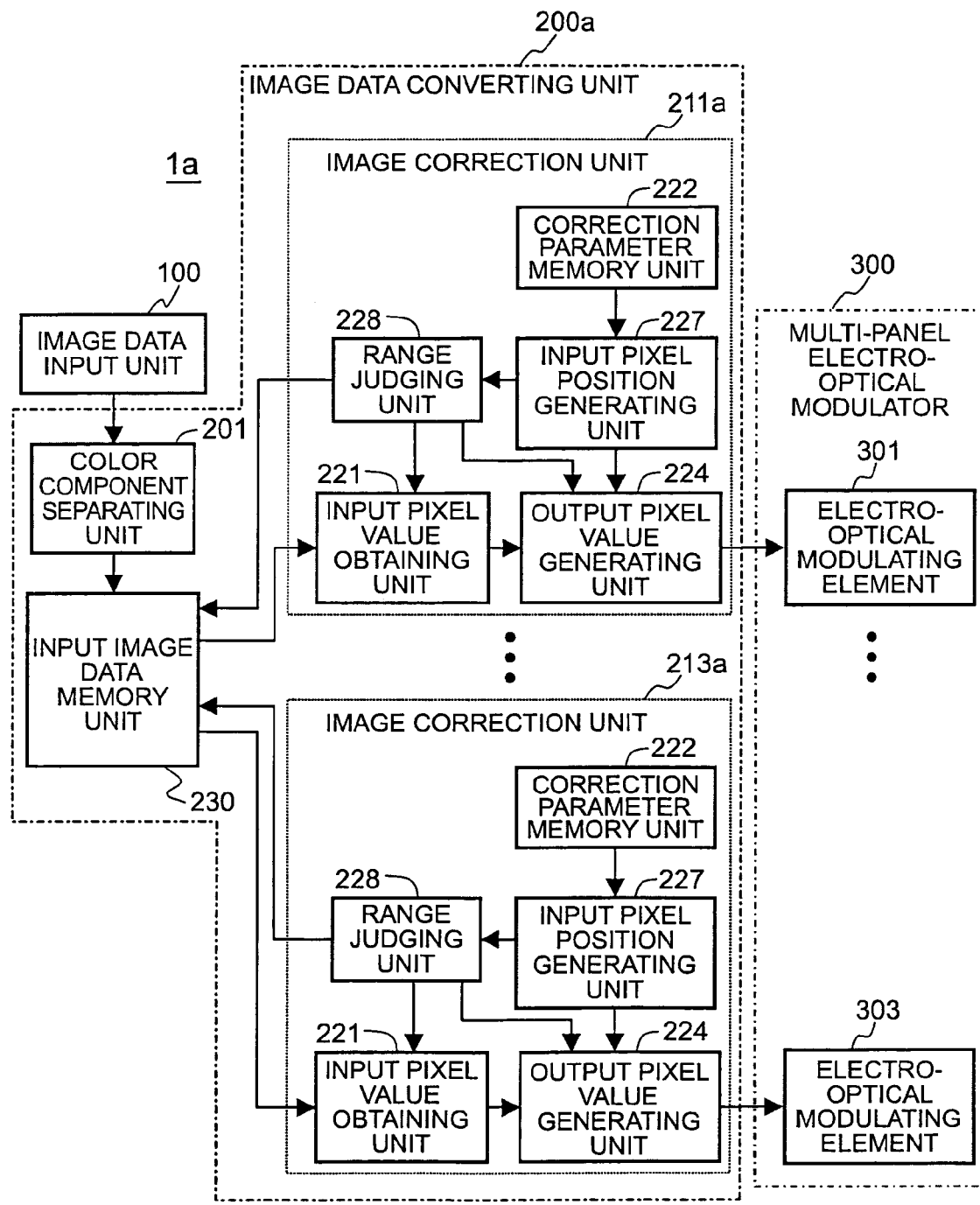
FIG. 8 is a schematic showing the configuration of a projector according to a second exemplary embodiment.

FIG. 8 is a view showing the schematic configuration of a projector according to a second exemplary embodiment. As with the projector 1, according to the first exemplary embodiment, a projector 1a according to the second exemplary embodiment is also a projector provided with a multi-panel electro-optical modulator having plural electro-optical modulating elements.

One of differences from the first exemplary embodiment is that an input image data memory unit 230, capable of storing a screenful of input image data, is provided on the output side of the color component separating unit 201, so that input image data corresponding to respective color components separated in the color component separating unit 201 are stored temporarily in the input image data memory unit 230. This configuration eliminates the need for the output image data memory unit 225 provided to each of the image correction units 211 through 213 in the first exemplary embodiment (see FIG. 4).

In addition, instead of the output pixel position generating unit 223 provided in the first exemplary embodiment, an input pixel position generating unit 227 is provided to each of the image correction units 211a through 213a in the second exemplary embodiment. The input pixel position generating unit 227 finds an input pixel position (hereinafter, referred to as a temporary input pixel position) corresponding to a given output pixel, and then generates one or more than one (for example, three) input pixel position in the neighborhood of the temporary input pixel position thus found.

Further, each of the image correction units 211a through 213a in the second exemplary embodiment includes a range judging unit 228 that judges whether one or more than one (for example, three) input pixel position used to interpolate a given output pixel falls within the range of the input image data.

Furthermore, the output pixel value generating unit 224 in each of the image correction units 211a through 213a in the second exemplary embodiment is furnished with a function of interpolating a pixel value of a given output pixel on the basis of respective pixel values at the three input pixel positions in the neighborhood of the temporary input pixel position found by the input pixel position generating unit 227 and the judgment result by the range judging unit 228, and then generating the interpolated pixel value as an output pixel value.

Concrete operations of the input pixel position generating unit 227, the range judging unit 228, and the output pixel value generating unit 224 will be described below.

In the projector 1a, according to the second exemplary embodiment, as with the projector 1 according to the first exemplary embodiment, correction parameters are generated on the basis of positional displacement information. The basis of positional displacement information is about displacements in position among plural projection images generated by the respective electro-optical modulating elements 301 through 303, and stored into the correction parameter memory unit 222, in advance, at the time of manufacturing or shipment of the projector 1a.

Figure 9:
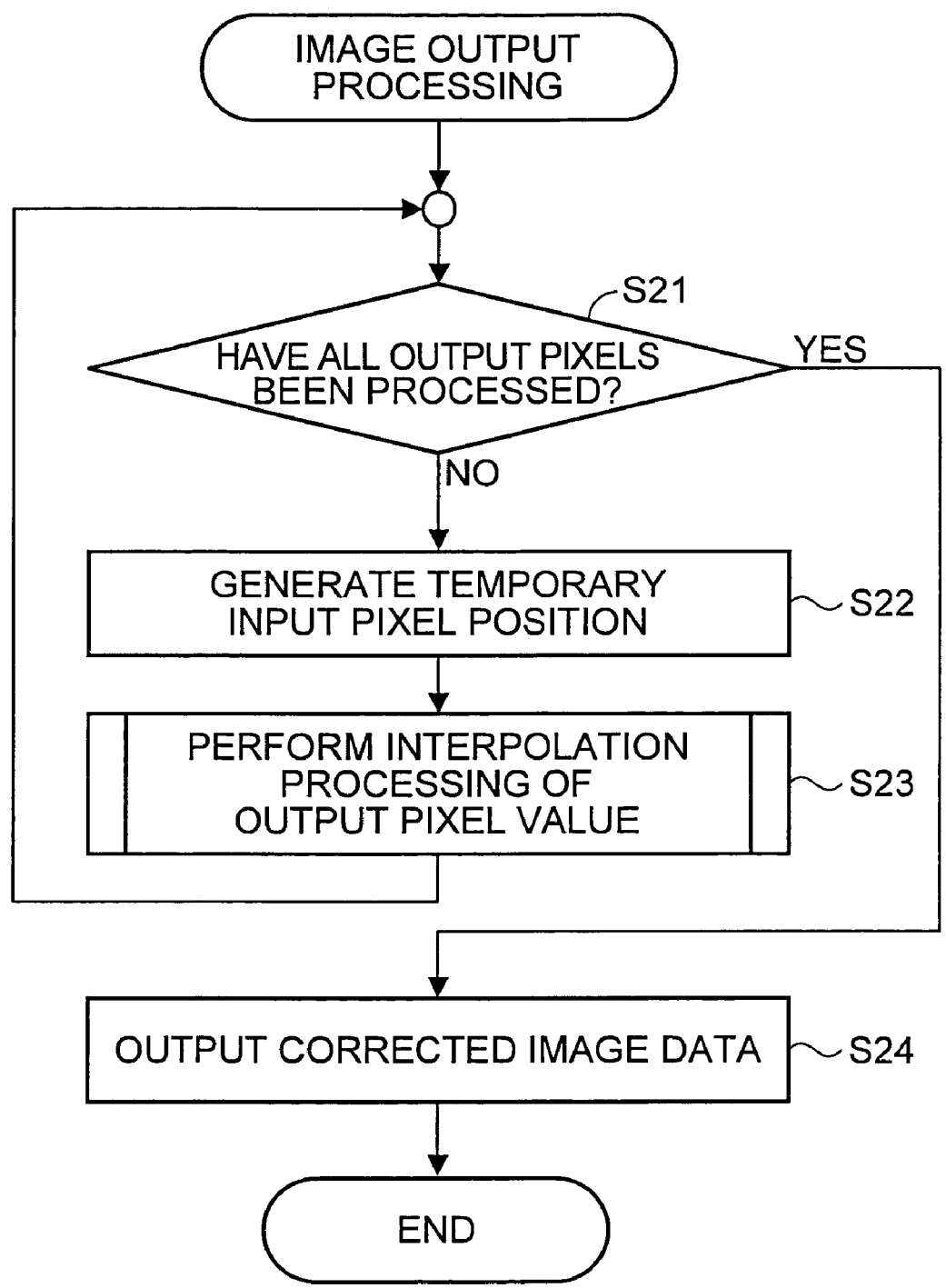
FIG. 9 is a flowchart detailing image correction processing that each image correction unit in the projector according to the second exemplary embodiment performs on a screenful of input image data.

FIG. 9 is a flowchart detailing the image correction processing that each of the image correction units 211a through 213a, in the projector 1a according to the second exemplary embodiment, performs on a screenful of input image data. Hereinafter, operations of the respective image correction units 211a through 213a shown in FIG. 8 will be described by this flowchart.

As is shown in FIG. 9, the image correction processing is performed for all the output pixels that can be outputted on plural electro-optical modulating elements 301 through 303. Initially, whether all the output pixels have undergone interpolation processing is judged (Step S21). When not all the output pixels have undergone interpolation processing, a temporary input pixel position corresponding to an output pixel is found (Step S22). Generally, the temporary input pixel position found in this instance does not coincide with the pixel position in the input image data. Hence, interpolation processing for an output pixel value is performed (Step S23), by which one output pixel is interpolated using plural pixels in the input image data. Subsequently, whether all the output pixels have been interpolated is judged (Step S21). When all the output pixels have undergone interpolation processing, corrected image data is outputted (Step S24).

Figure 10:
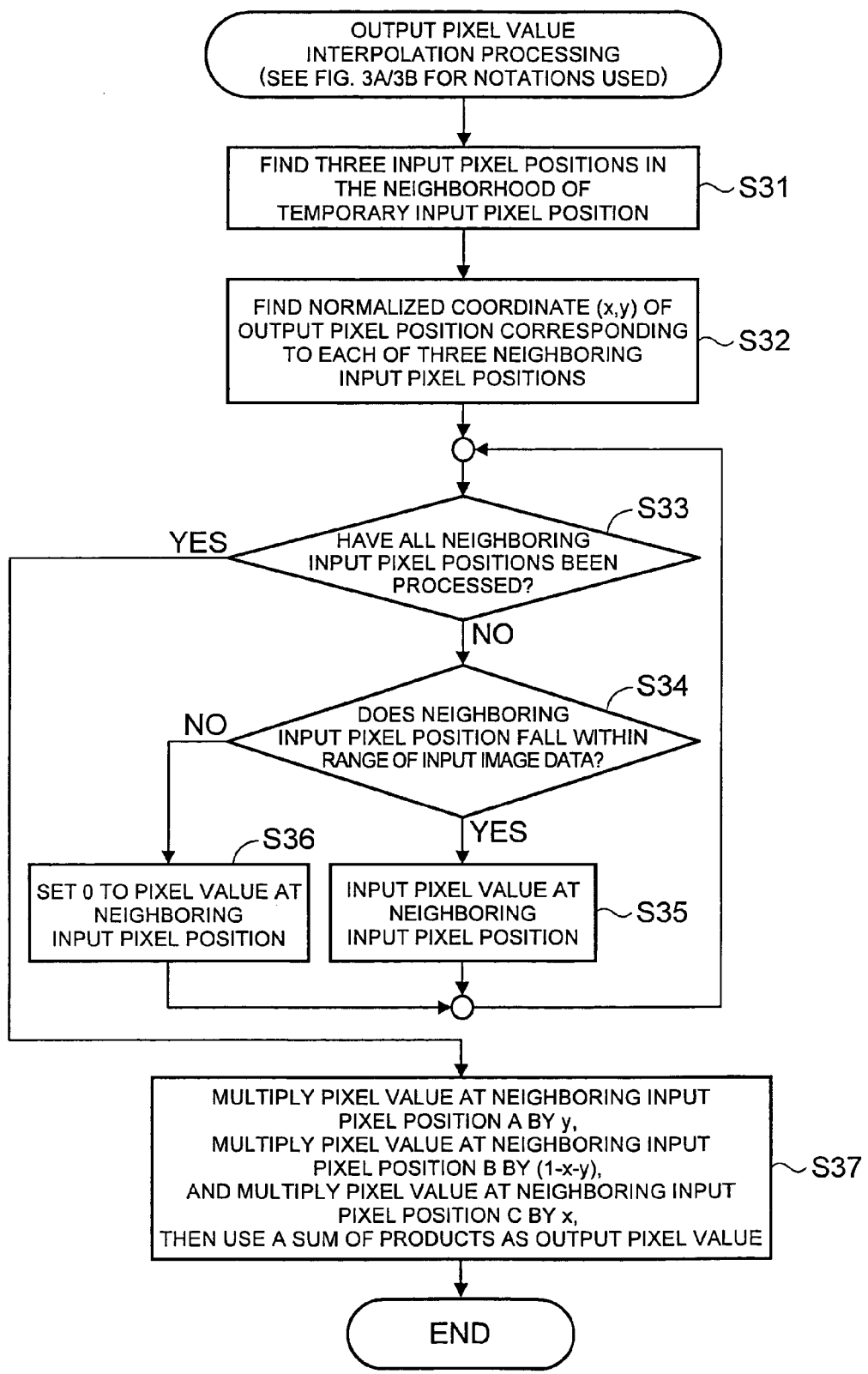
FIG. 10 is a flowchart detailing interpolation processing of an output pixel value shown in Step S23 of FIG. 9.

FIG. 10 is a flowchart detailing the interpolation processing shown in Step S23 of FIG. 9.

Referring to FIG. 10, three input pixel positions in the neighborhood of the temporary input pixel position corresponding to an output pixel (hereinafter, referred to as the neighboring input pixel positions) are found (Step S31). A normalized coordinate (x, y) of the output pixel position corresponding to each of the three neighboring input pixel positions is found (Step S32). Thereafter, processing in Step S33 through Step S37 is performed.

To be more specific, for the neighboring input pixel positions (referred to as the neighboring input pixel positions A, B, and C as is shown in FIG. 3A or 3B), whether the neighboring input pixel position falls within the range of the input image data is judged for each of the three neighboring input pixel positions A, B, and C (Step S34). When the neighboring input pixel position falls within the range of the input image data, the pixel value at the neighboring input pixel position is inputted (Step S35). When the neighboring input pixel position falls outside the range of the input image data, the pixel value at the neighboring input pixel position is set to 0 (Step S36).

This processing is performed for each of the neighboring input pixel positions A, B, and C. When the processing is completed for all the neighboring input pixel positions A, B, and C (Step S33), interpolation processing is performed using the pixel values at all the neighboring input pixel positions A, B, and C. To be more concrete, of the three neighboring input pixel positions A, B, and C, the pixel value at the neighboring input pixel position A is multiplied by y of the normalized coordinate, the pixel value at the neighboring input pixel position B is multiplied by (1-x-y) of the normalized coordinate, and the pixel value at the neighboring input pixel position C is multiplied by x of the normalized coordinate, and a sum of these products is used as the output pixel value (Step S37).

The processing shown in FIG. 10 is similar to that described in the first exemplary embodiment; however, they are different in the two following points.

The first point is that the processing in the second exemplary embodiment is processing through which the value of one output pixel is interpolated using three pixels in the input image data, whereas the processing in the first exemplary embodiment is processing through which the data of one pixel in the input image data is distributed to the three output pixels in the neighborhood.

The second point is that it is necessary in the second exemplary embodiment to judge whether the input pixel position corresponding to the output pixel position falls within the range of the input image data, whereas the output pixel value outside the range of the input image data is automatically set to 0 in the first exemplary embodiment because the input image data is distributed. The judgment necessary in the second exemplary embodiment is performed by the range judging unit 228 (see FIG. 8).

Figure 11:
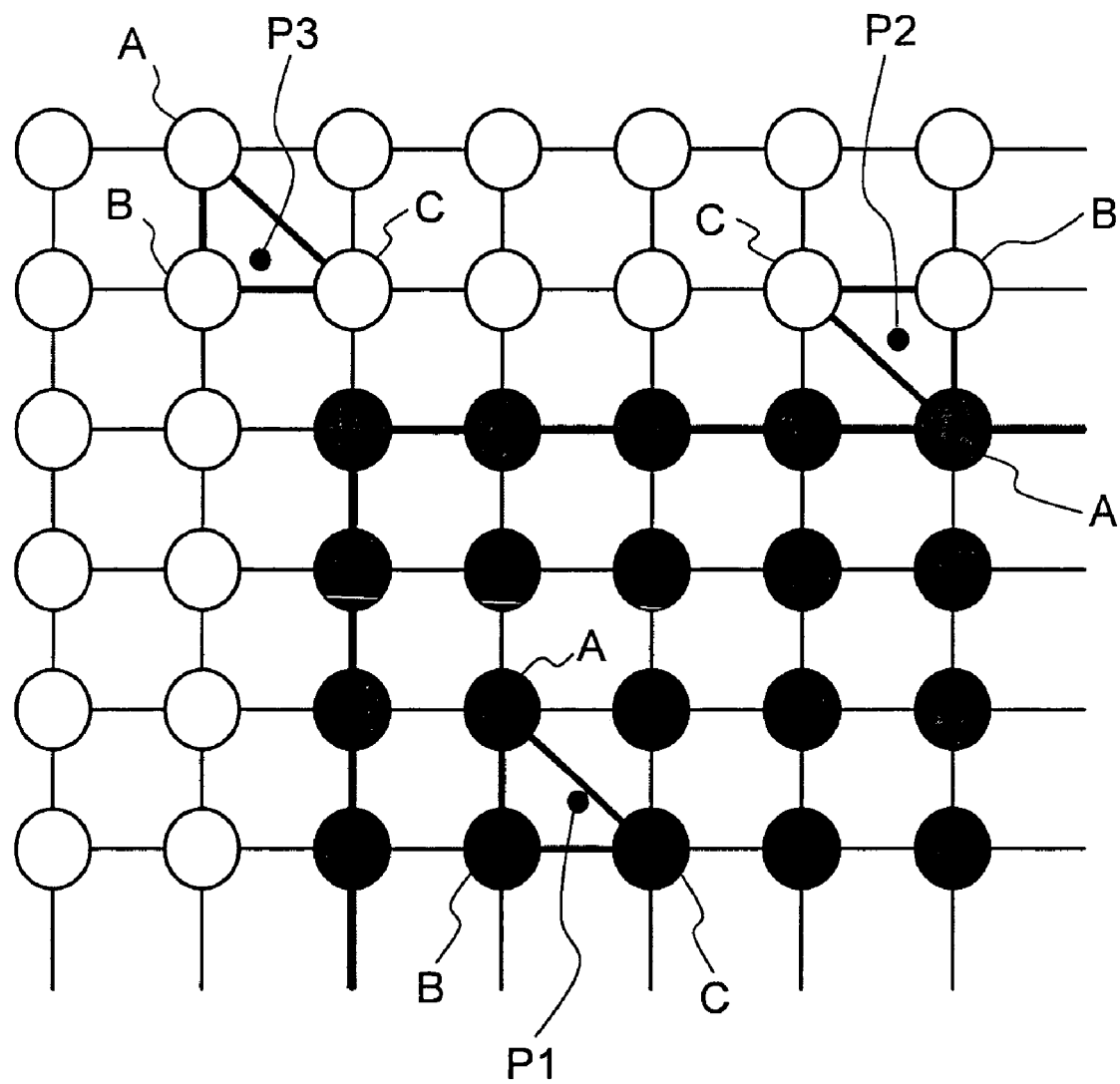
FIG. 11 is a schematic used to describe an example where an input pixel position corresponding to an output pixel position falls within a range of the input image data is judged.

FIG. 11 is a view used to describe a case where whether the input pixel position corresponding to an output pixel position falls within the range of the input image data. Black circles in FIG. 11 indicate the input pixel positions that fall within the range of the input image data, and white circles indicate the input pixel positions that fall outside the range of the input image data.

Referring to FIG. 1, assume that the input pixel position (temporary input pixel position) corresponding to an output pixel is present at the position indicated by P1 in FIG. 11, then three neighboring input pixel positions A, B, and C that fall within the range of the input image data are present in the neighborhood of P1. Hence, the output pixel value can be found through computation for the interpolation as described in Step S37 of FIG. 10, using the pixel values at these three neighboring input pixel positions A, B, and C.

Assume that the input pixel position (temporary input pixel position) corresponding to an output pixel is present at the position indicated by P2 in FIG. 11. Then, of the three neighboring input pixel positions A, B, and C present in the neighborhood of P2, only the neighboring input pixel position A is judged to be the input pixel position that falls within the range of the input image data, and the other two input pixel positions B and C are judged to be those that fall outside the range of the input image. In this case, the computation to interpolate the output pixel value as described in Step S37 of FIG. 10 is performed by setting the pixel values at the positions outside the range of the input image data to 0.

Likewise, assume that the input image position is present at the position indicated by P3. Then, of three neighboring input pixel positions A, B, and C present in the neighborhood of P3, none of input pixel positions A, B, or C is judged to fall within the range of the input image data. Hence, the computation to interpolate the output pixel value as described in Step S37 of FIG. 10 is performed by setting the pixel values at the positions outside the range of the input image data to 0. In this case, 0 is given as the pixel value of the output pixel.

As has been described, in the flowchart of FIG. 10, whether the three neighboring input pixel positions fall within the range of the input image data is judged, and their pixel values are set when they fall within the range of the input image data. 0 is set as the pixel values when the input pixel positions fall outside the range of the input image data. Thereafter, the pixel values at the three neighboring input pixel positions A, B, and C are multiplied by weights y, (1-x-y), and x, respectively, and a sum of the products obtained from the respective pixel values is outputted as the output pixel value.

The processing to find the input pixel position corresponding to an output pixel in Step S31 of FIG. 10 is the same as the processing in the first exemplary embodiment. Hence, it is possible to correct all the displacements in position with regards to six degrees of freedom of the respective electro-optical modulating elements 301 through 303 by merely giving the coordinates of four corners on the respective electro-optical modulating elements 301 through 303 as the correction parameters. In addition, because the output image data is processed successively, there is no need to save the output image data.

Third Exemplary Embodiment

Figure 12:
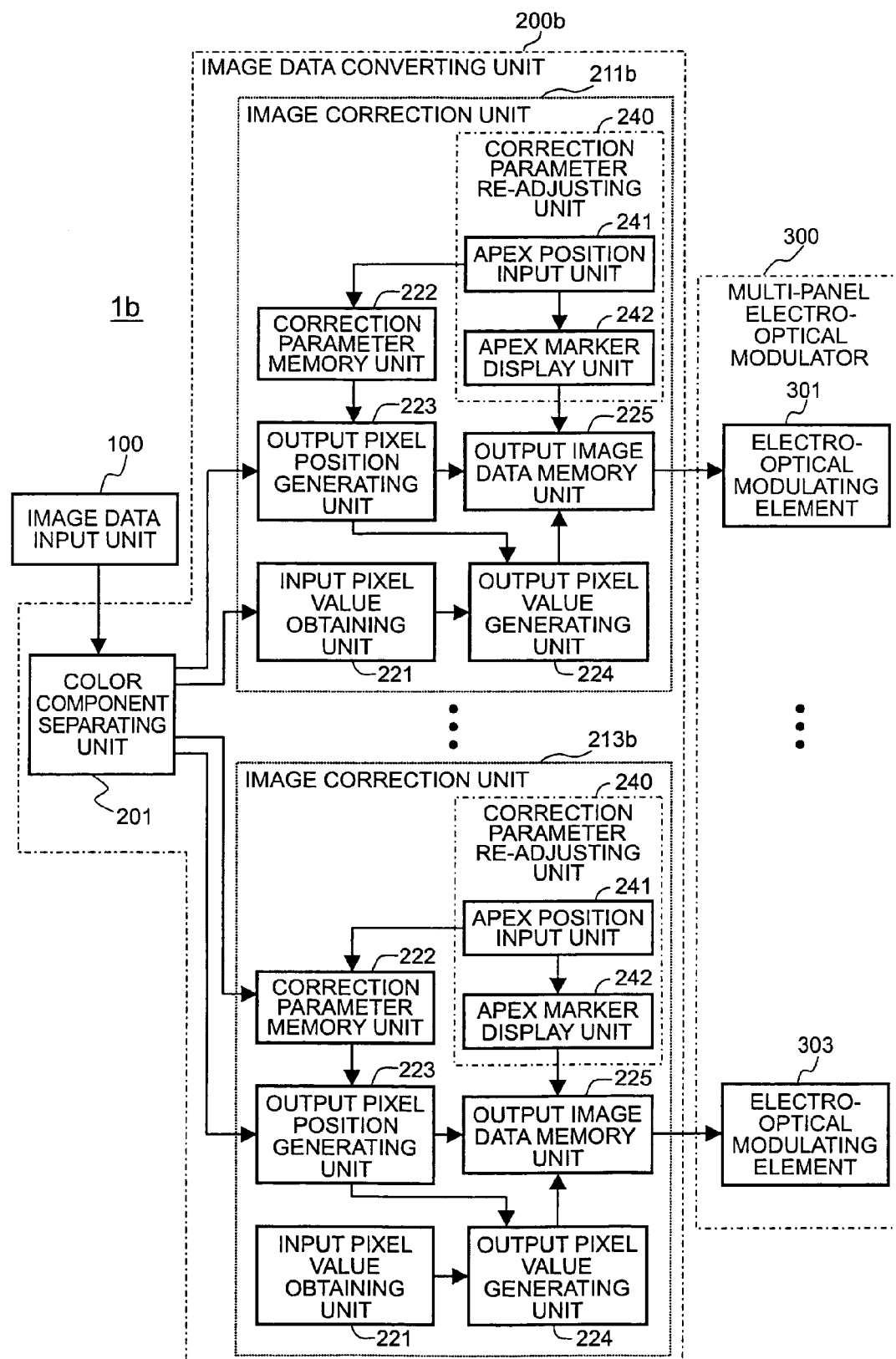
FIG. 12 is a schematic showing the configuration of a projector according to a third exemplary embodiment.

FIG. 12 is a view showing the schematic configuration of a projector according to a third exemplary embodiment. As with the projector 1 according to the first exemplary embodiment, and the projector 1a according to the second exemplary embodiment, a projector 1b according to the third exemplary embodiment is a projector provided with a multi-panel electro-optical modulator having plural electro-optical modulating elements.

The third exemplary embodiment differs from the first exemplary embodiment and the second exemplary embodiment in that it includes a correction parameter re-adjusting unit 240 capable of re-adjusting the correction parameters. The configuration shown in FIG. 12 is an example where the correction parameter re-adjusting unit 240 is additionally provided to the configuration shown in FIG. 4, used to describe the first exemplary embodiment. It should be appreciated, however, that the correction parameter re-adjusting unit 240 can be additionally provided to the configuration shown in FIG. 8, used to describe the second exemplary embodiment.

To be capable of changing the vertex positions of input images formed on the electro-optical modulating elements 301 through 303 on the projection surface, the correction parameter re-adjusting unit 240 includes, for example, an vertex position input unit 241 used to input the vertex positions of four corners of an input image, and an vertex marker display unit 242 that displays an vertex marker. This configuration enables the user to re-adjust correction parameters when the respective electro-optical modulating elements are misaligned relatively with respect to the projection system with the use of the projector over a long period or when components are replaced.

The mouse may have this capability of the vertex position input unit 241, in a case where the projector 1b is connected, for example, to a personal computer. Alternatively, in a case where the projector 1b is used as the TV set, the arrow keys on the remote controller of the TV set may have the capability.

Figure 13A:
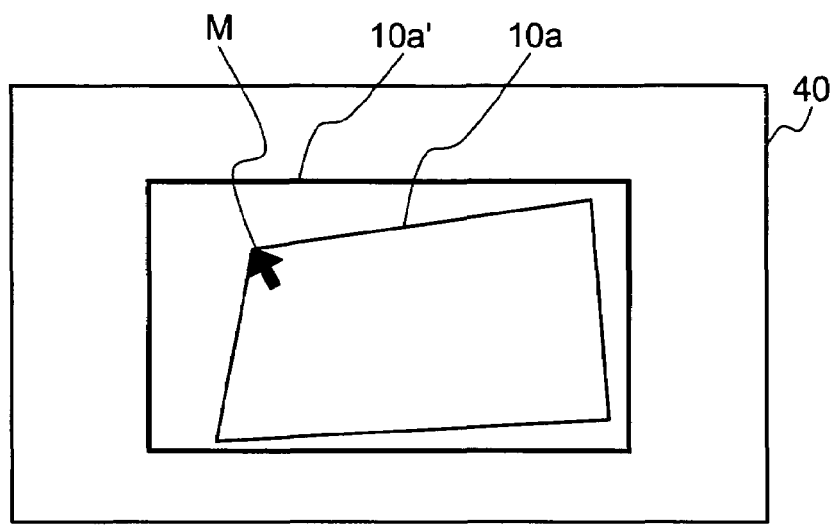
FIGS. 13A and 13B are schematics used to describe the capability of a correction parameter re-adjusting unit in an exemplary embodiment.
Figure 13B:
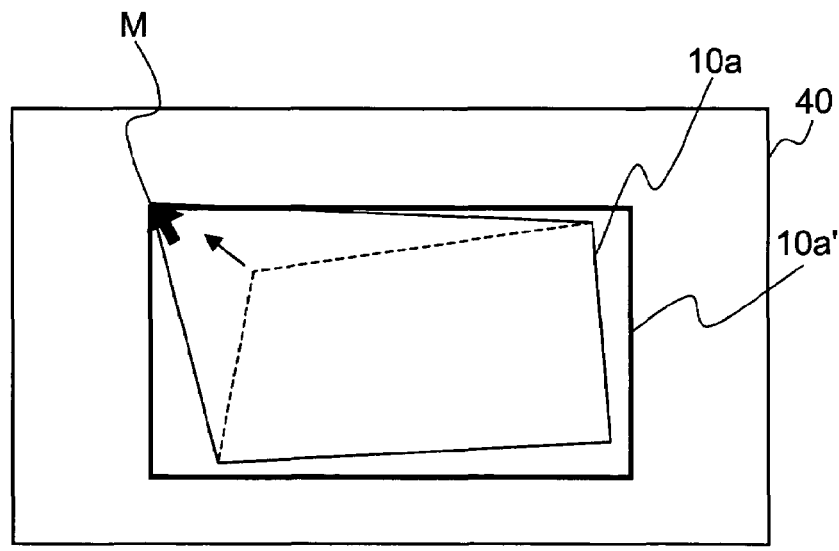

FIGS. 13A and 13B are views used to describe the capability of the correction parameter re-adjusting unit 240. Referring to FIG. 13A, a quadrangle in thin line indicates a projection image 10a of a given color component at a given point in time on the projection surface 40, and a quadrangle in thick line indicates a projection image 10a' used as the reference.

In this instance, the vertex marker display unit 242 displays a display marker M, for example, in the form of a thick arrow, as is shown in FIG. 13A, on one of the four corners of the projection image 10a, to indicate that this vertex is an vertex that needs adjustment at this point in time.

The user thus moves the display marker M as is shown in FIG. 13B by manipulating, for example, the mouse or the arrow keys on the remote controller. The user repeats this manipulation until the display marker M is moved to the position of the vertex of the projection image 10a' used as the reference. By performing this processing for all the four corners, it is possible to set the adjusted vertex coordinates of the four corners in the correction parameter memory unit 222 (see FIG. 12) as the correction parameters.

As has been described, according to the third exemplary embodiment, the user is able to re-adjust correction parameters when the respective electro-optical modulating elements are misaligned relatively, with respect to the projection system with the use of the projector over a long period or when components are replaced.

Fourth Exemplary Embodiment

Figure 14:
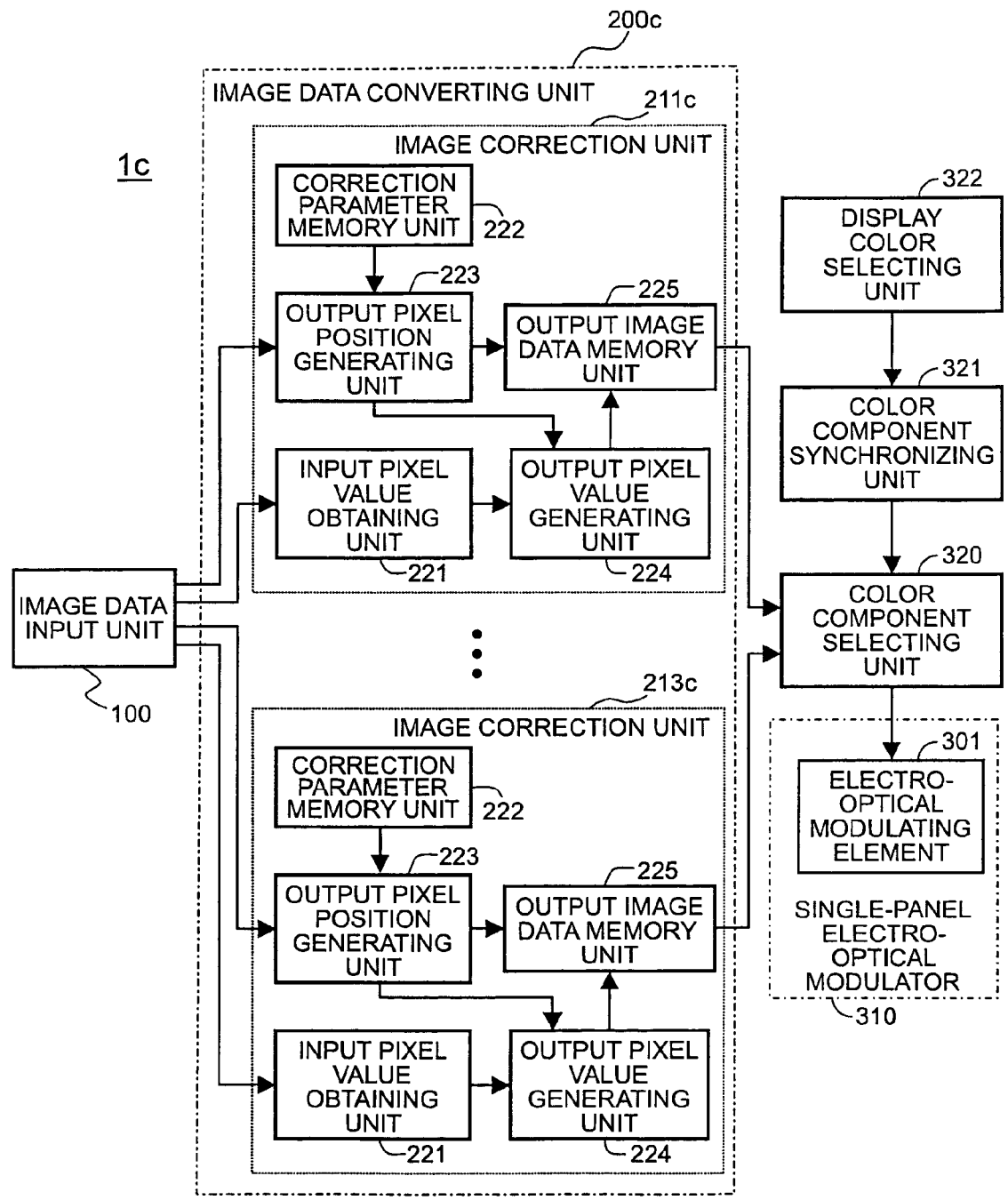
FIG. 14 is a schematic showing the schematic configuration of a projector according to a fourth exemplary embodiment.
Figure 15A:
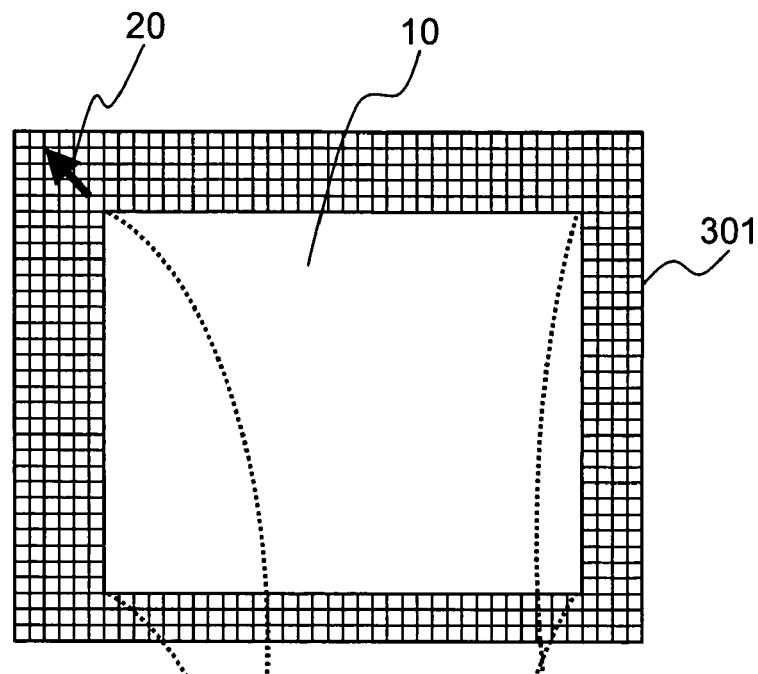
FIGS. 15A and 15B are views used to describe corrections that are likely to occur and corrected in the related art.
Figure 15B:
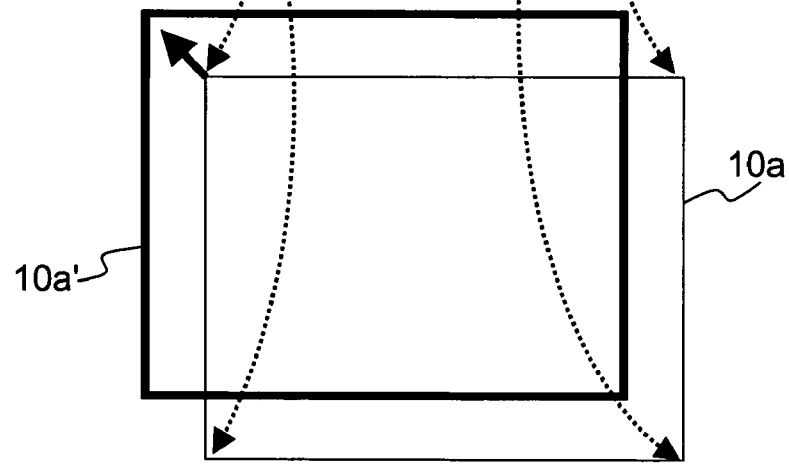
Figure 16A:
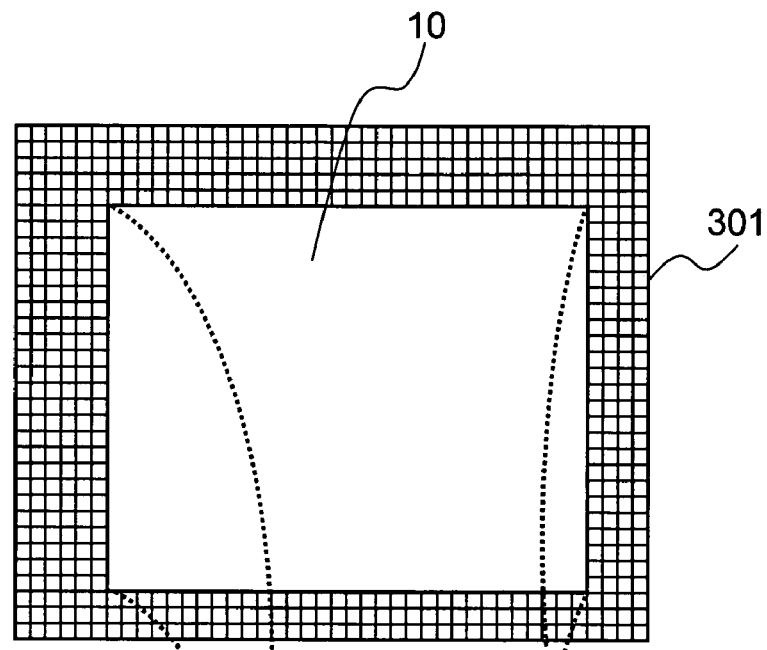
FIGS. 16A and 16B are schematics showing projection images when the electro-optical modulating elements are misaligned due to rotations about three axes in the related art.
Figure 16B:
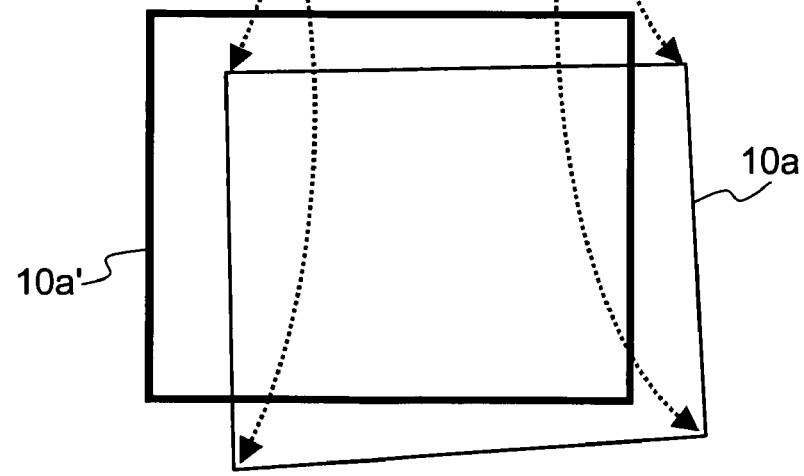

FIG. 14 is a schematic configuration of a projector according to a fourth exemplary embodiment. The fourth exemplary embodiment differs from the first exemplary embodiment through the third exemplary embodiment in that, as is shown in FIG. 14, a single-panel electro-optical modulator 310 having a single electro-optical modulating element 311 is used as an electro-optical modulator used in a projector 1c. Even when a single-panel electro-optical modulator is used, as in this embodiment, optical axes of respective colors may be displaced in a case where LEDs (Light Emitting Diodes) corresponding to respective color components are used as the light source of the illumination device. It is therefore preferable to change correction parameters for each color. The fourth exemplary embodiment is applicable in such a case.

For an input signal automatic detecting method to be implement by the projector 1c, according to the fourth exemplary embodiment, as is shown in FIG. 14, the single-panel electro-optical modulator 310 having the single electro-optical modulating element 311 is used as the electro-optical modulator. In addition, a color component selecting unit 320, a color component synchronizing unit 321, and a display color selecting unit 322 are provided on the output side of the image correction units 211c through 213c. It is configured in such a manner that the color component selecting unit 320 switches output image data corrected in the respective image correction units 211c through 213c according to a signal from the color component synchronizing unit 321 to be inputted into the single electro-optical modulating element 311.

Operations of the respective image correction units 211c through 213c in the fourth exemplary embodiment are the same as those of the counterparts in the first exemplary embodiment, and description thereof are omitted herein. The respective image correction units 211c through 213c may be of the same configuration as that of the counterparts in the second or third exemplary embodiment. In such a case, operations of the respective image correction units are the same as those of the counterparts in the second and third exemplary embodiments.

It should be appreciated that the exemplary embodiments of the invention are not limited to the embodiments described above, and can be modified in various manners without deviating from the spirit or scope of the exemplary embodiments as will be described by way of the following examples.

(1) Each of the exemplary embodiments described above, the image correction units 211 through 213, 211a through 213a, 211b through 213b, or 21c through 213c are provided for respective color components. However, the exemplary embodiments are not limited to this configuration. For example, it is possible to correct image data of respective color components in time division using a single image correction unit.

(2) Each of the above exemplary embodiments describe corrections of displacements in position among plural projection images resulting from misalignments of the electro-optical modulator with respect to the projection system due to parallel translations or rotations or both. However, the exemplary embodiments are not limited to this configuration. For example, it is possible to correct displacements in position among plural projection images due to relative misalignments at least between two components among the illumination device, the electro-optical modulating elements, and the projection system.

(3) Each of the above exemplary embodiments describe only the image corrections to suppress displacements in position among plural projection images as the processing performed by the image data converting units 200, 200a, 200b, or 200c. However, the exemplary embodiments are not limited to this configuration. For example, it is also possible to perform image corrections by taking into account positional displacement information about displacements in position among plural projection images when various kinds of image data conversion are performed, including image corrections (luminance correction, color correction) to suppress unevenness in luminance and color among plural projection images, image corrections (corrections of keystone distortion) to correct keystone distortions of an image, resolution conversion to convert resolution of an image, addition of special effects to render special effects on an image, etc.

(4) Of course, the projector of the exemplary embodiments can be either a front projector or a rear projector.

(5) In the exemplary embodiments, not only is it possible to create an image data converting program in which is written the processing procedure to implement the image data converting method employed in the projectors of the exemplary embodiments described above, but it is also possible to record the image data converting program into a recording medium, such as a flexible disc, an optical disc, and a hard disc. The exemplary embodiments therefore include the image data converting program and a recording medium having recorded the image data converting program as well. It goes without saying that the image data converting program of the exemplary embodiments can be distributed via a network.

What is claimed is:

1. A projector, comprising:
   an image data converting unit that generates output image data by performing predetermined image data conversion on input image data;
   a multi-panel electro-optical modulating device having plural electro-optical modulating elements each of which generates an image light by modulating a light from an illumination device according to the output image data from the image data converting unit; and
   a projection system that projects plural projection images, the plural projection images being projected by plural image lights generated by the multi-panel electro-optical modulating device onto a projection surface,
   the image data converting unit performing the image data conversion on the input image data for each electro-optical modulating element in the multi-panel electro-optical modulating device based on the positional displacement information of displacements in position among the plural projection images;
   the image data converting unit having an image correction unit that corrects input image data for each of the electro-optical modulating elements based on the positional displacement information, the image correction unit including;
   an input pixel value obtaining unit that obtains an input pixel value from the input image data,
   a correction parameter memory unit that stores correction parameters generated on the basis of positional displacement information,
   an output pixel position generating unit that generates one or more than one output pixel position in the neighborhood of an input pixel position for respective input pixel positions obtained from the input image data on the basis of the correction parameters,
   an output pixel value generating unit that generates, as an output pixel value, a pixel value at the one or more than one output pixel position by distributing the input pixel value at each input pixel position to a pixel at the one or more than one output pixel position, and an output image data memory unit that stores the output pixel position and the output pixel value.

2. The projector according to claim 1, the displacements in position among the plural projection images being displacements in position resulting from relative misalignments at least between two components among the illumination device, the two components including the plural electro-optical modulating elements and the projection system.

3. The projector according to claim 2, the displacements in position among the plural projection images being displacements in position resulting from misalignments of the plural electro-optical modulating elements with respect to the projection system due to at least one of parallel translations and rotations.

4. The projector according to claim 1, the image data converting unit further including an input image data memory unit that stores the input image data, and the image correction unit including:
the input pixel value obtaining unit that obtains the input pixel value from the input image data stored in the input image data memory unit;
an input pixel position generating unit that finds a temporary input pixel position corresponding to a given output pixel on the basis of the correction parameters, and then generates one or more than one input pixel position in the neighborhood of the temporary input pixel position found previously; and
an output pixel value generating unit that interpolates a pixel value of the one output pixel on the basis of the input pixel value at the one or more than one input pixel position, and then generates an interpolated pixel value as an output pixel value.

5. The projector according to claim 4, the image correction unit further including a range judging unit that judges whether the one or more than one input pixel position falls within a range of the input image data.

6. The projector according to claim 1, the image correction unit further including a correction parameter re-adjusting unit capable of re-adjusting the correction parameters.

7. The projector according to claim 6, the correction parameter re-adjusting unit having a capability of changing an vertex position of the input image data formed on each of the electro-optical modulating elements.

8. The projector according to claim 1, the image data converting unit further including an input image data separating unit that separates the input image data for each of the electro-optical modulating elements.

9. The projector according to claim 1, the multi-panel electro-optical modulating device including plural electro-optical modulating elements that modulate lights of respective color components obtained as a result of color separation.

10. The projector according to claim 1, the multi-panel electro-optical modulating device including an electro-optical modulating element that modulates a light according to a luminance signal and an electro-optical modulating element that modulates a light according to a chromaticity signal.

11. An image data converting method adapted to a projector, comprising:
generating output image data with an image data converting unit by performing predetermined image data conversion on input image data,
generating an image light, with a multi-panel electro-optical modulating device having plural electro-optical modulating elements, by modulating a light from an illumination device based on output image data from the image data converting unit;
projecting plural image lights generated in the multi-panel electro-optical modulating device onto a projection surface as plural projection images with a projection system;
performing image data conversion on the input image data for each of the electro-optical modulating elements in the multi-panel electro-modulating device by taking into account positional displacement information about displacements in position among the plural projection images; and
correcting the input image data for each electro-optical modulating element based on the positional displacement information, the correction of the input image data including:
obtaining an input pixel value that obtains an input pixel value from the input image data,
storing correction parameters that are generated on the bases of the positional displacement information,
generating one or more than one output pixel position in the neighborhood of an input pixel position for respective input pixel positions obtained from the input image data on the bases of the correction parameters,
generating, as an output pixel value, a pixel value at the one or more than one output pixel position by distributing the input pixel value at each input pixel position to a pixel at the one or more than one output pixel position, and
storing the output pixel position and the output pixel value.

12. An image data converting program adapted to a projector, the projector including an image data converting unit that generates output image data by performing predetermined image data conversion on input image data, a multi-panel electro-optical modulating device having plural electro-optical modulating elements each of which generates an image light by modulating a light from an illumination device based on output image data from the image data converting unit; and a projection system that projects plural image lights generated in the multi-panel electro-optical modulating device onto a projection surface as plural projection images, the image data converting program embodied on a computer readable medium, the image data converting unit having an image correction unit, the image correction unit corrects input image data for each of the electro-optical modulating elements based on the positional displacement information the image correction unit including: an input pixel value obtaining unit that obtains an input pixel value from the input image data, a correction parameter memory unit that stores correction parameters generated on the basis of the positional displacement information, an output pixel position generating unit that generates one or more than one output pixel position in the neighborhood of an input pixel position for respective input pixel positions obtained from the input image data on the basis of the correction parameters, an output pixel value generating unit that generates, as an output pixel value, a pixel value at the one or more than one output pixel position by distributing the input pixel value at each input pixel position to a pixel at the one or more than one output pixel position, and an output image data memory unit that stores the output pixel position and the output pixel value, the image data converting program comprising:
a program for causing the image data converting unit to perform image data conversion on the input image data for each of the electro-optical modulating elements in the multi-panel electro-modulating device positional displacement information about displacements in position among the plural projection images.

13. A projector, comprising:
an image data converting unit that generates output image data by performing predetermined image data conversion on input image data;
a single-panel electro-optical modulating device having a single electro-optical modulating element that generates plural image lights by modulating a light from an illumination device in time division based on output image data from the image data converting unit; and
a projection system that projects plural image lights generated in the single-panel electro-optical modulating device onto a projection surface as plural projection images,
the image data converting unit performing the image data conversion on the input image data independently for the input image data forming each of the plural projection images based on positional displacement information about displacements in position among the plural projection images;
the image data converting unit having an image correction unit that corrects input data for each of the electro-optical modulating elements based on the positional displacement information the image correction unit including:
an input pixel value obtaining unit that obtains an input pixel value from the input image data,
a correction parameter memory unit that stores correction parameters generated on the basis of the positional displacement information,
an output pixel position generating unit that generates one or more than one output pixel position in the neighborhood of an input pixel position for respective input pixel positions obtained from the input image data on the basis of the correction parameters,
an output pixel value generating unit that generates, as an output pixel value, a pixel value at the one or more than one output pixel position by distributing the input pixel value at each input pixel position to a pixel at the one or more than one output pixel position, and
an output image data memory unit that stores the output pixel position and the output pixel value.

14. An image data converting method adapted to a projector, the projector including an image data converting unit that generates output image data by performing predetermined image data conversion on input image data, a single-panel electro-optical modulating device having a single electro-optical modulating element that generates plural image lights by modulating a light from an illumination device in time division based on output image data from the image data converting unit; and a projection system that projects plural image lights generated in the single-panel electro-optical modulating device onto a projection surface as plural projection images, the image data converting unit having an image correction unit, the image correction unit corrects input image data for each of the electro-optical modulating elements based on the positional displacement information the image correction unit including; and includes: an input pixel value obtaining unit that obtains an input pixel value from the input image data, a correction parameter memory unit that stores correction parameters generated on the basis of the positional displacement information, an output pixel position generating unit that generates one or more than one output pixel position in the neighborhood of an input pixel position for respective input pixel positions obtained from the input image data on the basis of the correction parameters, an output pixel value generating unit that generates, as an output pixel value, a pixel value at the one or more than one output pixel position by distributing the input pixel value at each input pixel position to a pixel at the one or more than one output pixel position, and an output image data memory unit that stores the output pixel position and the output pixel value, the method comprising:
performing the image data conversion on the input image data independently for the input image data forming each of the plural projection images based on positional displacement information of displacements in position among the plural projection images.

15. An image data converting program adapted to a projector including an image data converting unit that generates output image data by performing predetermined image data conversion on input image data, a single-panel electro-optical modulating device having a single electro-optical modulating element that generates plural image lights by modulating a light from an illumination device in time division based on output image data from the image data converting unit; and a projection system that projects plural image lights generated in the single-panel electro-optical modulating device onto a projection surface as plural projection images, the image data converting unit having an image correction unit, the image correction unit that corrects input image data for each of the electro-optical modulating elements and based on the positional displacement information of the image correction unit including; an input pixel value obtaining unit that obtains an input pixel value from the input image data, a correction parameter memory unit that stores correction parameters generated on the basis of the positional displacement information, an output pixel position generating unit that generates one or more than one output pixel position in the neighborhood of an input pixel position for respective input pixel positions obtained from the input image data on the basis of the correction parameters, an output pixel value generating unit that generates, as an output pixel value, a pixel value at the one or more than one output pixel position by distributing the input pixel value at each input pixel position to a pixel at the one or more than one output pixel position, and an output image data memory unit that stores the output pixel position and the output pixel value, the image data converting program being embodied on a computer readable medium and comprising:
a program for causing the image data converting unit to perform the image data conversion on the input image data independently for the input image data forming each of the plural projection based on positional displacement information of displacements in position among the plural projection images.

* * * * *